US009097036B2

(12) United States Patent
DiBella et al.

(10) Patent No.: US 9,097,036 B2
(45) Date of Patent: Aug. 4, 2015

(54) SECURITY SYSTEM AND DEVICES FOR MUSICAL INSTRUMENTS AND FIREARMS

(71) Applicants: Paul Roy DiBella, Cumming, GA (US); David Homer Biggs, Gardnerville, NV (US)

(72) Inventors: Paul Roy DiBella, Cumming, GA (US); David Homer Biggs, Gardnerville, NV (US)

(73) Assignee: Iguana Technologies, LLC, Alpharetta, GA (US)

( * ) Notice: Subject to any disclaimer, the term of this patent is extended or adjusted under 35 U.S.C. 154(b) by 296 days.

(21) Appl. No.: 13/652,760

(22) Filed: Oct. 16, 2012

(65) Prior Publication Data

US 2013/0278411 A1 Oct. 24, 2013

Related U.S. Application Data

(60) Provisional application No. 61/547,828, filed on Oct. 17, 2011.

(51) Int. Cl.

| | |
|---|---|
| ***G08B 21/00*** | (2006.01) |
| ***E05B 63/00*** | (2006.01) |
| ***E05B 39/00*** | (2006.01) |
| ***E05B 73/00*** | (2006.01) |
| ***G10D 3/00*** | (2006.01) |
| ***G10G 7/00*** | (2006.01) |
| *G10D 1/08* | (2006.01) |
| *E05B 47/00* | (2006.01) |
| *G08B 13/06* | (2006.01) |
| *G08B 13/14* | (2006.01) |

(52) U.S. Cl.

CPC ............... *E05B 63/00* (2013.01); *E05B 39/005* (2013.01); *E05B 73/0017* (2013.01); *E05B 73/0023* (2013.01); *G10D 3/00* (2013.01); *G10G 7/00* (2013.01); *E05B 2047/0096* (2013.01); *G08B 13/06* (2013.01); *G08B 13/149* (2013.01); *G08B 13/1472* (2013.01); *G10D 1/08* (2013.01)

(58) Field of Classification Search

CPC .................. G07C 2009/0092; G07C 9/00896; G07C 9/00309; G07C 5/008

USPC .............. 340/5.31, 5.7, 5.73, 527, 542, 572.9

See application file for complete search history.

(56) References Cited

U.S. PATENT DOCUMENTS

| | | | | |
|---|---|---|---|---|
| 3,587,081 | A * | 6/1971 | Hawkins et al. | 340/529 |
| 5,448,221 | A * | 9/1995 | Weller | 340/539.21 |
| 2002/0153396 | A1* | 10/2002 | French et al. | 224/244 |
| 2008/0174431 | A1* | 7/2008 | Rodgers | 340/572.1 |
| 2009/0135015 | A1* | 5/2009 | Dobson et al. | 340/572.9 |
| 2010/0326145 | A1* | 12/2010 | Powers et al. | 70/158 |

* cited by examiner

*Primary Examiner* — Mark Rushing

(74) *Attorney, Agent, or Firm* — Laurence P. Colton; Smith Risley Tempel Santos LLC

(57) ABSTRACT

A security system having a device that attach directly to and locks on or around an object to be secured, or one or more parts of the system are integrated into a full or partial enclosure that fully or partially encloses or surrounds the object to be secured, that cannot be removed from the object or enclosure without disengaging the locking mechanism through a provided method, and when the device is attached to the object or integrated into the enclosure, the system renders the object unusable for its intended use, and the system is capable of determining location, has a radio transmitter and/or transceiver capable of processing, transmitting and/or relaying information, data and images over terrestrial and/or satellite communication networks, and can include various sensors and other data and image gathering methods, and can contain an audible alarm.

47 Claims, 15 Drawing Sheets

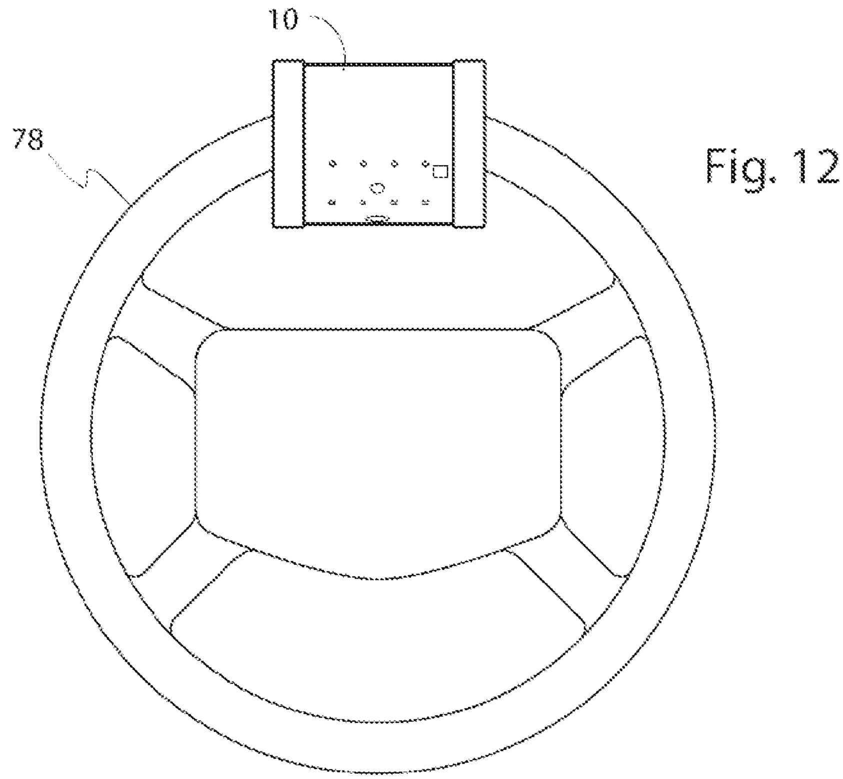
Fig. 12
Fig. 13
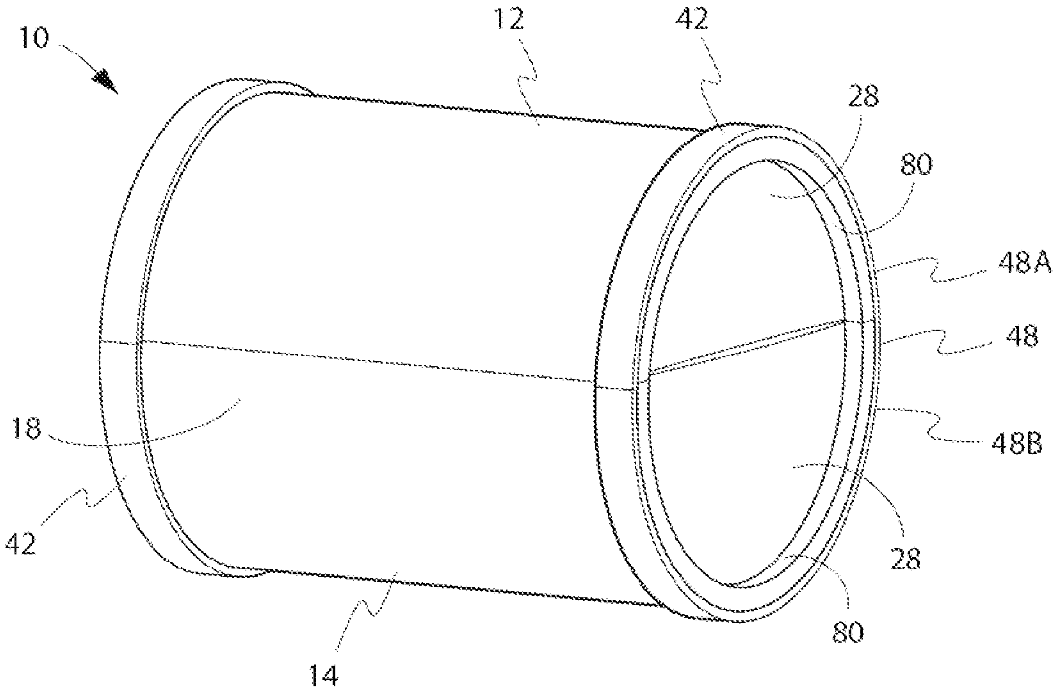

Fig. 22
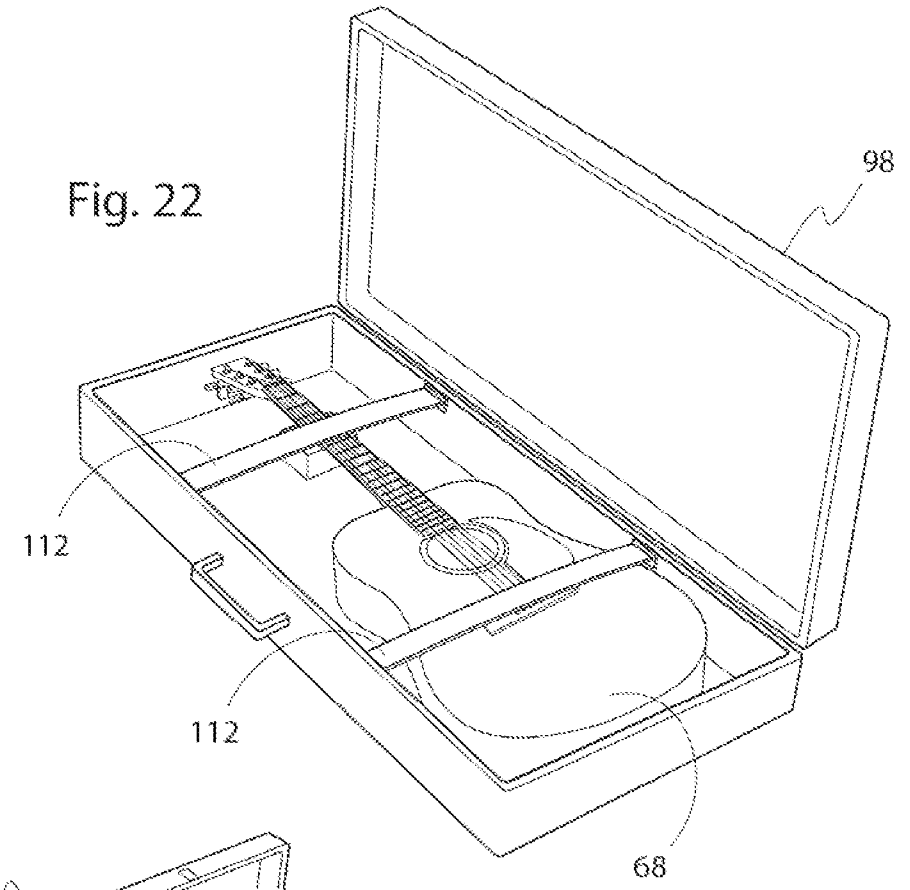
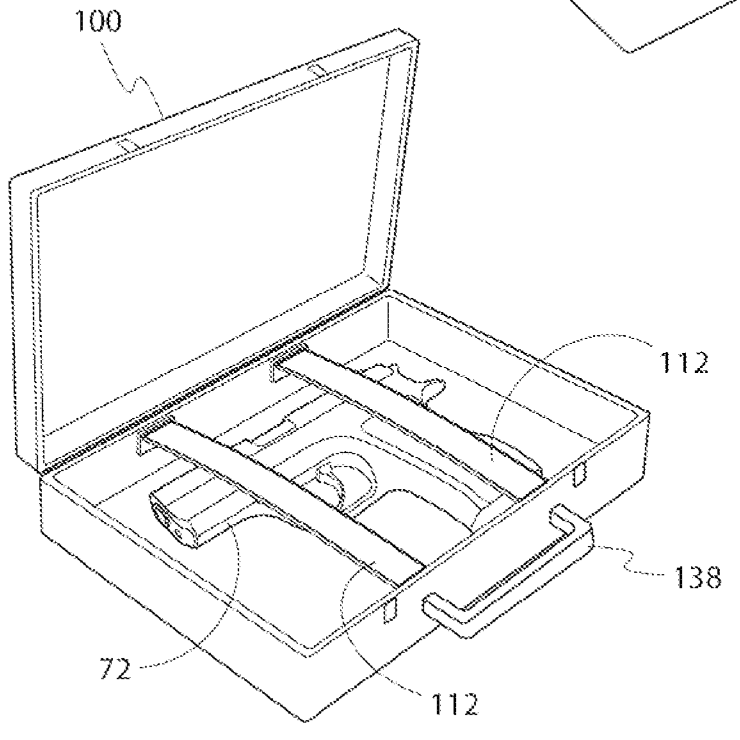
Fig. 23

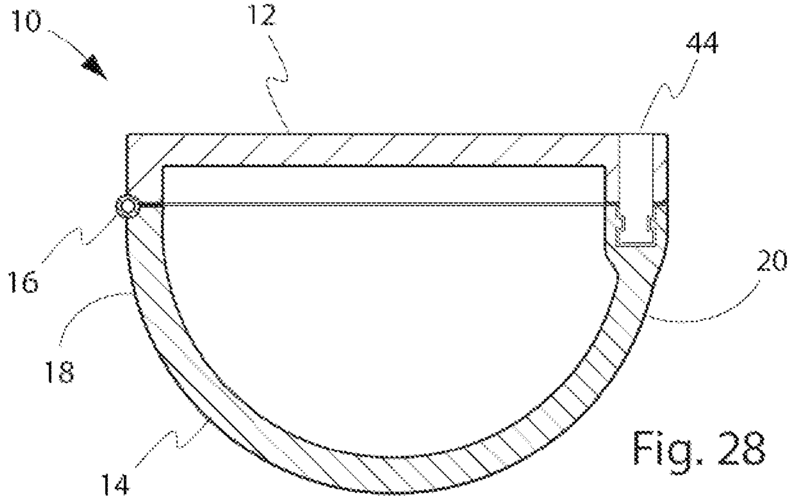
Fig. 28
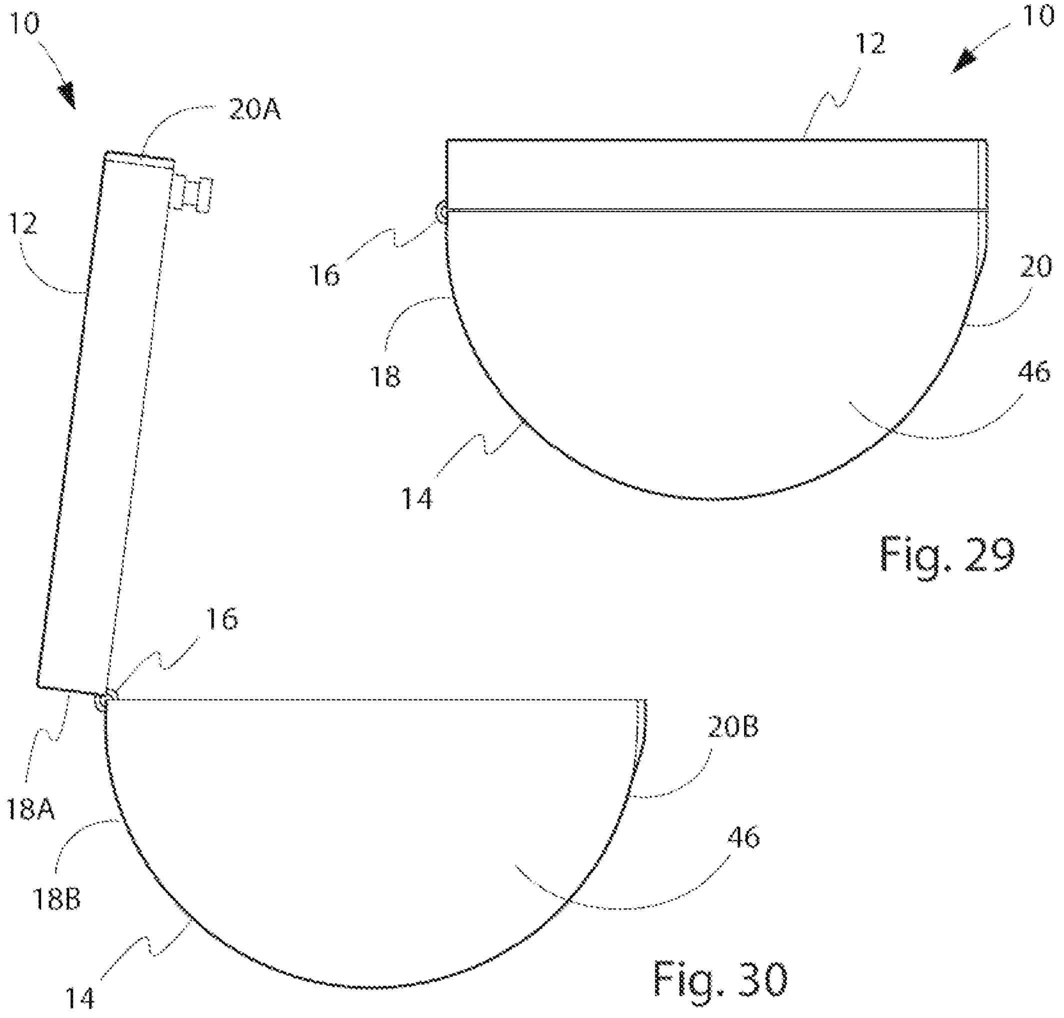
Fig. 29
Fig. 30

SECURITY SYSTEM AND DEVICES FOR MUSICAL INSTRUMENTS AND FIREARMS

STATEMENT OF RELATED APPLICATIONS

The present application is a Nonprovisional of and claims the benefit of U.S. Provisional Patent Application No. 61/547,828 having a filing date of 17 Oct. 2011.

BACKGROUND OF THE INVENTION

1. Technical Field

This invention is generally related to the technical field of security systems and devices for objects and more specifically related to the technical field of security systems and devices for personal items, portable items, oddly or unusually shaped items, and items for which security systems and devices do not presently exist.

2. Prior Art

Each year, thousands of valuable personal items (objects) such as musical instruments, firearms, and bicycles are lost, misplaced, or stolen, and most of these items are never recovered and returned to their rightful owners. Many of these objects are one of a kind, custom-made, specialty or of sentimental value, objects that cannot be easily or readily replaced. There currently is no means for securing these types of objects in a manner that when attached to an object renders the object unusable for its intended use, and, when activated by motion or other provided means, transmits location information and other information regarding the object to which it is attached, yet does not alter or damage the article when attaching or removing the securing means.

Locking mechanisms are available that attempt to prevent use or removal of an object. These mechanisms are not capable of providing location or identity information, thus they are not useful in helping to recover an object that is lost, misplaced or stolen. There also are various types of active and passive radio tags that can be attached to objects or embedded into objects. When activated, these tags are capable of transmitting data over short distances. In an active tag, the tag is transmitting data, and when in the proximity of a data reader, the data can be directed to the reader. In a passive tag, the tag merely contains data, and when in the proximity of a reader, the reader is capable of gathering the data from the tag. Irrespective of whether a tag is active or passive, a tag requires a separate reader device in close proximity to collect the data. Thus, a tag system is useless in relaying any information in the absence of a reader device in close proximity. Even where readers are present and in close proximity to the tags, tags do not provide precise location information, and once the object is removed from the close proximity to the reader, the location and identity of the object is no longer available. Consequently, these tags are virtually useless in helping actively recover an object. For those active tags that do not require a separate reader but instead are capable of transmitting data over various networks, these tags can be easily removed from an object thereby rendering them ineffective for security and recovery.

Additionally, for tags that are embedded into an object, the tag is required to be embedded either at the time of manufacture of the object or after the manufacture of the object. Manufacturers and artists of highly crafted musical instruments and other specialty, custom, or high value objects are reluctant to embed any foreign device, object or material into the object, thereby interfering with or otherwise violating the purity, integrity, or aesthetics of the object. Further, embedding a tag after manufacture often requires drilling or some other activity that alters the object from its original state, thereby also violating the purity, integrity, or aesthetics of the object. For many highly crafted and specialty objects, violating the original object in any way results in a decrease in value of the object and renders the object less desirable.

Therefore, there is a need for a system and device for securing objects of value, which device does not damage the objects, which device can produce an audible alarm, and/or which device can communicate with a remote device for tracking the object and providing information regarding the objects location and/or status. It is to such a need and others that the present invention is directed.

BRIEF SUMMARY OF THE INVENTION

The present invention overcomes the disadvantages of existing systems and devices. The present invention prevents use of an object and discourages the theft and/or unauthorized use of an object while the invention is affixed or attached to the object or a part of the object, or is integrated into a full or partial enclosure used to carry, store, protect or display the object, in a manner that does not damage, alter, or otherwise violate or compromise the purity, integrity, or aesthetics of the object. Further, the present invention is an active security system that does not require the user to take any action to activate the system once it is placed in ready mode, and, when the system is activated by at least one of the modes of activation, is capable of gathering, capturing, storing, and transmitting data and information to predetermined recipients over terrestrial and or satellite networks, and that does not require a separate data reader in the proximity of the device. The present invention is capable of gathering, storing, and transmitting location data. Additionally, the present invention is capable of capturing, storing and transmitting data regarding the system's environment, such as temperature and humidity and is capable of capturing, storing and transmitting images.

Briefly, the invention comprises a system for securing objects such as musical instruments, firearms, bicycles, and other objects and personal valuables, which system includes one or more devices that attach, affix, and lock on, to, and/or around an object or part of an object, or which parts of the system can be integrated into a full or partial enclosure used to carry, store, protect, or display an object, in which system and/or one or more of its component devices are means for determining and reporting location information and for capturing images and other information, and a radio transmitter or transmitter and transceiver that can process and transmit all such information over networks, such as terrestrial or satellite networks, or both, using web-based interfaces and applications to disseminate and report the information. A suitable means for determining and reporting location information comprising a radio transmitter or transmitter and transceiver that can process and transmit all such information over networks, such as terrestrial or satellite networks, or both, using web-based interfaces and applications to disseminate and report the information, is the Globalstar simplex transmitter/transceiver disclosed in U.S. Pat. No. 8,130,096. The system and/or one or more of its devices also can contain an audible alarm that sounds an alert when the system is activated. The presence of such a system would act as a deterrent to unauthorized use of an object and theft of an object and would help facilitate the recovery of an object that is otherwise misplaced, lost or stolen.

There is a system for securing items such as musical instruments, firearms and other valuables, which system includes one or more portable devices that lock on, to and/or around an item, or part thereof, in which system and/or a device there is a means for determining location of the device and/or of the system, and in which there is a radio transmitter and/or transmitter/transceiver that can process location and other information and communicate all such information over wireless networks, such as terrestrial or satellite networks, or both, which system uses web-based interfaces and applications or other forms of information dissemination. See FIGS. 1-4. The system also can contain various sensors and an audible alarm and/or a camera and/or other optical device or devices that are capable of capturing images when the system is activated, which images can assist in the recovery of items and provide useful information to law enforcement personnel. The system is comprised of one or more devices that work independently or collectively with other devices and/or other components in the system. The presence of such a system would act as a deterrent to theft and/or unauthorized use of an item and would help facilitate the recovery of items that are otherwise lost or stolen.

A device is capable of being attached or affixed to an item by having one or more parts of a device clamp on, to and/or around an object or a part thereof. A device, or one or more of its parts, closes and/or locks when clamped on, to and/or around an object or part of an object. A device cannot be removed from an object without damaging the object or otherwise compromising the integrity of the object, thereby rendering the object unusable in accordance with the objects intended design and use. Consequently, with a device attached or affixed, the object is less valuable and has less utility to anyone but the object owner or owner designated third party who can remove the device as intended.

Additionally, or alternatively, the system, a device, or a part of the system and/or device, can be integrated into a case that is used to carry, protect or enclose an object. In these instances, the system, or a part thereof, includes one or more lockdown mechanisms that secure the object or one or more parts of the object to the case or enclosure in such a manner that removing the object from the case or enclosure without the appropriate entry key, code and/or identification would damage the object and/or activate the processing of photographic, image and/or location information, rendering the object virtually useless, and/or of significantly less value and utility to anyone but the object's owner or authorized custodian. See FIG. 21.

The system, including its devices, operates wirelessly and is powered by batteries, except that in a system in which there are one or more devices paired with another part of the system, one or more parts of the system and/or devices may be attached to an electrical power source. A system and its devices can be modified to operate on sources of power other than batteries or electric power. The system may be configured to conserve battery and/or power when the system cannot detect satellite and/or terrestrial networks.

A device, or part thereof, that is to be affixed or attached to an object, has one or more openings that allow for the device, or a part thereof, to be secured on, to and/or around all or part of an object. By way of example, on a guitar, a device, or a part thereof, closes on, to and/or around the neck of the guitar or other part of the guitar. See FIGS. 8-9. On a trumpet, a device, or a part thereof, closes on, to and/or around the lead pipe, bell or other part of the trumpet. On a firearm, a device, or part thereof, closes on, to and/or around the barrel of the firearm, or on, to or around the trigger of the firearm and/or trigger area of the firearm, or on, to or around another area of the firearm. See FIGS. 10-11. The sizes of the openings on a device can vary to accommodate different sizes of objects or object parts to which the device, or part thereof, can be attached to, on and/or around.

The system may be configured to be activated by at least one mode, including at least unauthorized movement or use of a secured object, loss of communication with a device paired with another part of the system or on the acquisition or loss of GPS satellite signals. The system owner or owner designated third party also can voluntarily activate the system by alternative authorized means, such as with a key fob type control device. When activated, the system communicates an alert to the object owner or owner designated third party, and the transmitter and/or transmitter/transceiver begins processing location and other information and can communicate the information at predetermined intervals. The system can also sound an audible alarm when activated. The audible alarm can be contained in a device or in another part of the system. Activation of the system also activates any camera or optical image capturing sensor contained in the system. The system operates using one-way only communication, two-way communication, or both, communicating over one or more satellite networks, over one or more terrestrial networks, or over a combination of one or more satellite and terrestrial networks.

Detection of unauthorized movement, unauthorized use, and/or loss of communication with a device paired with one or more parts of the system is accomplished through various means or combinations of means, including, but not limited to, any of the following, and combinations thereof: radio waves, magnetic fields, internal and/or external sensors, including, but not limited to: acoustic sensors; optical and infrared sensors and video image processors; magnetic sensors and magnetometers; infrared laser radar, ultrasonic sensors, and microwave radar sensors; induction inductive-loop detectors; acquisition of GPS or loss of GPS signals; and, triboelectric, seismic, and inertia-switch sensors. On systems utilizing two-way communication, the owner or owner designated party can turn the system and/or device into ready mode and deactivate the system and/or device by communicating with the system. When the system is activated, the transmitter and/or transmitter/receiver begins processing location information and other information, including for example photographic information, and stores and/or transmits the information, and, in those systems containing an audible alarm, the audible alarm sounds, and in those systems containing a camera or other optical sensor, the system capture images, with the system continuing to be activated and operating until one or more of the following, but not limited to the following, occurs: (i) the system and/or appropriate device is unlocked using the designated point of entry and/or an authorized means of entry; (ii) a specified period of time elapses after activation, and/or (iii) the owner, custodian or designated party communicates with the system and/or appropriate device and deactivates the system and/or appropriate device. With the system and/or its devices turned on, the system and its associated devices revert to ready mode after a specified period time following deactivation.

A device is constructed primarily of tamper resistant exterior materials such as hardened steel and/or other metals, composites and/or other materials. A device contains one or more various sized openings that allow the device to be attached or affixed on, to and/or around the object. See FIG. 13. An opening on a device may contain padding or other soft material to protect the surface of the object to which the device is affixed and/or attached. See FIGS. 1-4. A device that locks on, to and/or around an object or part of an object cannot be properly removed from the object without a key, code, identification or other form of authorized entry. There is a system and/or a device on-off switch that is accessible through the secured interior of the system and/or a device, and, with regard to cases and enclosures where the system and/or a device is integrated into the case, the on/off switch is located within a secured area of the case or enclosure. A LED or other light source illuminates when the system/device is on. The system can only be activated when the system and/or a device is turned on and in ready mode, which places the system and/or a device in ready mode.

A device may contain an antennae extension or signal extender that allows the device and/or any part of the system to better transmit radio signals while the device and/or any part of the system is enclosed in a case or other enclosure. The antennae extension or signal extender can be retractable, free-hanging, or completely detached from a device.

When not used for musical instruments, firearms, or other portable objects, portions of a device interior can be removed and replaced with one or more alternate chambers or fittings. An alternate chamber or fitting may contain different sized openings, allowing the device to fit on or around objects the standard openings do not fit. There is also an alternate chamber or fitting that has no openings so as to fully and completely enclose one or more objects within the device, allowing for the storage of small items and valuables such as jewelry. For these fully enclosed alternate chamber or fitting, the fitting or chamber encloses those portions of the device that are otherwise open for purposes of affixing and/or attaching a device on, to and/or around an object or one or more parts of an object. See FIGS. 28-30.

A system device can be constructed of two primary but separate pieces consisting of a top piece and a bottom piece, relatively equal in size. The two pieces are connected by a hinging mechanism on one side and comprise a locking mechanism on another non-hinged side typically opposite the hinged side. The non-hinged side opens and closes and is used to allow the device to be secured about the object. Thus, the pieces open and close to allow the device to be clamped on and around an object or one or more parts of an object. Alternatively, the two primary but separate pieces can be non-hinged but interlock when they come together on the sides that meet.

The exterior or outer shell of the device is made of a hard, tamper resistant material such as hardened steel or a hard composite, of such a thickness to prevent or hinder breakage of or cutting through the material. If a material such as steel is used, the outer shell preferably contains at least one small opening near electronics contained within the device so as to allow radio waves and other signals to enter and leave the device and communicate with the interior electronics. The exterior of the device can incorporate an indicator light that illuminates to indicate status of the device.

The interior of the device, and particularly the interior of the top piece and the bottom piece, can be generally hollow so as to contain functional and/or other necessary and/or optional components. For example, each of the top piece and the bottom piece can have a generally cup- or bowl-shaped configuration, with open ends of the cups or bowls facing each other when the device in the closed position. With such a configuration, in the closed position, the closed ends and sides of the pieces would present a predominantly and/or generally uniformly closed exterior or barrier protecting the interior of the device and preventing or hindering unauthorized persons from accessing the interior of the device.

The interior of the bottom piece of the device can comprise padding, such as memory type foam, partially or preferably completely filling the interior of the bottom piece. The padding can be removable. The interior of the top piece of the device also can comprise padding, such as memory type foam, that abuts a compartment that houses the primary electronics and battery power supply of the device. The padding can be removable. The electronics compartment preferably abuts the interior surface of the top piece shell so as to facilitate the transmission of electronic signals, such as electromagnetic waves, from the electronic components to a remote receiving device. Appropriately sized ports or windows through the exterior of the top piece can facilitate or allow such electromagnetic waves to communicate through the exterior shell of the device and to the electronics contained within the device.

The padding preferably contacts the object to be secured so that the device does not damage the object when the device is attached to the object. Through the shape of the interior of device, such as the shape of the rim of the open sides of the top and bottom pieces, and the padding placed therein, a device, when fully closed, preferably fits generally snugly around, for example, a guitar or violin neck, firearm, bicycle frame, car steering wheel, as well as other objects similarly shaped. That is, an object or part of an object being rod-like or cylindrical in shape, or somewhat rod-like or cylindrical in shape where one or more sides can be flat or squared, so long as the padding can shape around the object or object part and the device closed about the object or object part.

The device comprises a locking mechanism opposite the hinged end, wherein the locking mechanism locks the two primary pieces of the device together. The locking mechanism can be any of the typical locking mechanisms, such as for example key locks, combination locks, button pad locks, and electronic locks. For example, the device can be capable of being mechanically or electronically locked and unlocked. As an alternative to a hinge, the device can be in two separate pieces having a tab and slot configuration or the equivalent on at least one side and the locking mechanism on another side preferably opposite the side having the tab and slot, wherein on one side the pieces fit into each other via the cooperation of the tab and slot, with the locking on the opposite end so that when locked the device cannot be opened without disengaging the lock.

There can be an on-off switch located on or near the exterior surface of the electronics compartment, below the removable padding. The switch preferably is within the interior of the device so as to prevent actuation when the device is closed and locked on an object. The device is capable of being electronically locked and unlocked, turned to ready mode, activated, and deactivated by for example a hand-held key fob type device, magnetic card, or similar activating mode. The device also can be locked and turned to ready mode, activated, and unlocked and deactivated, by key, code, or biometric (fingerprint identification) means. There also can be at least one USB port in the device for device accessories, for the transfer of information, and for programming and updating.

The electronics contained within the device can comprise an audible alarm, an electronic locking means, and/or a means for determining and reporting location information regarding the device, and thus regarding the object to which the device is attached. A suitable means for determining and reporting location can comprise a radio transmitter or transmitter and transceiver that can process and transmit all such information and activation alerts over terrestrial or satellite networks, or both, using web-based interfaces and applications to disseminate and report the information.

The system and devices that comprise an audible alarm sounds an alert when the system is activated and/or compromised. The presence of such a system would act as a deterrent to theft and/or unauthorized use of an object and would help facilitate the recovery of an object that is otherwise misplaced, lost or stolen. The system and/or at least one of its devices also can comprise a visual alarm, such as external light emitting diodes, that provides a visual alert when the system is activated and/or compromised. The system also is capable of providing the system owner or owner designated third party with notification that the system has been activated, such as, for example, with notification through messaging to a designated cellular or satellite device such as phone or other mobile device and/or by communicating to a computer or other device through a web-based interface.

In another embodiment, with some or all of the padding removed from the device, a locking pin attachment can be used to lock the device through an opening of an object to facilitate the device locking around part of object. An example would be where the pin locks in a device when the device is closed through the trigger area opening on a handgun or other gun. The pin can extend between the top piece and the bottom piece and can be secured in place on each piece by an appropriate structure located on the inner side of each piece.

These features, and other features and advantages of the present invention, will become more apparent to those of ordinary skill in the relevant art when the following detailed description of the preferred embodiments is read in conjunction with the appended drawings in which like reference numerals represent like components throughout the several views.

BRIEF DESCRIPTION OF THE DRAWINGS

FIG. 12 is a front view of an embodiment of a device according to the present invention secured to an automobile steering wheel.

FIG. 13 is a side perspective view of a device according to the present invention.

FIG. 22 is a top perspective view of a device according to the present invention incorporated into a musical instrument carrying case.

FIG. 23 is a top perspective view of a device according to the present invention incorporated into a firearm carrying case.

FIG. 28 is a side sectional view of a device according to the present invention.

FIG. 29 is a side view of the device of FIG. 28 in a closed position.

FIG. 30 is a side view of the device of FIG. 28 in an open position.

DETAILED DESCRIPTION OF PREFERRED EMBODIMENTS

Figure 1:
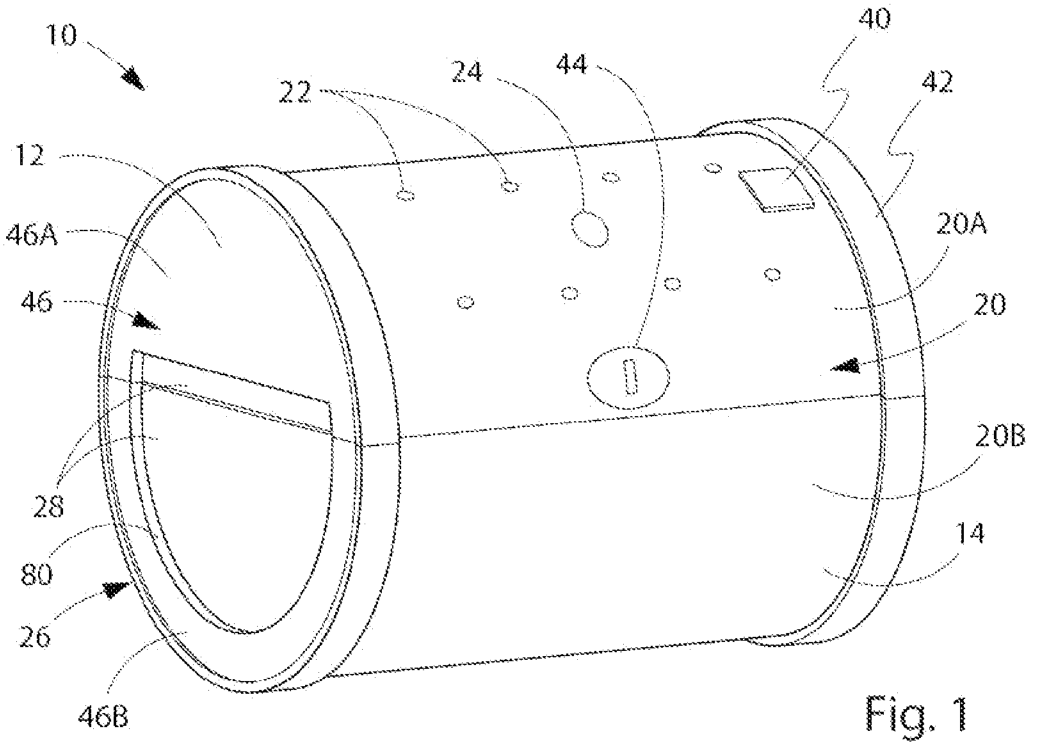
FIG. 1 is a front perspective view of an illustrative embodiment of a device according to the present invention in a closed position.
Figure 2:
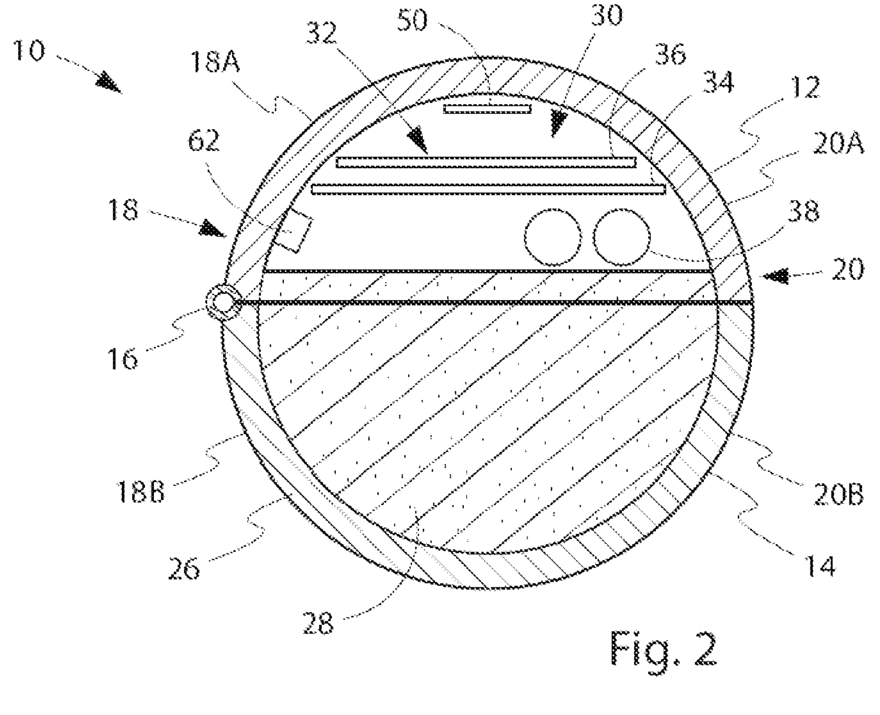
FIG. 2 is a side sectional view of the device of FIG. 1.
Figure 3:
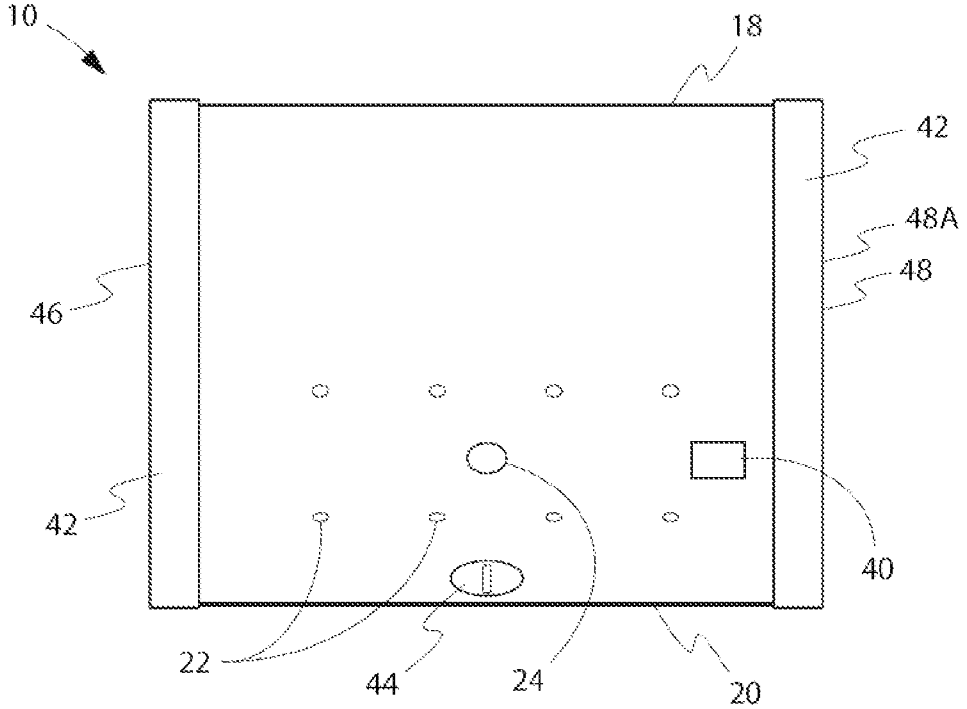
FIG. 3 is a top view of the device of FIG. 1.
Figure 4:
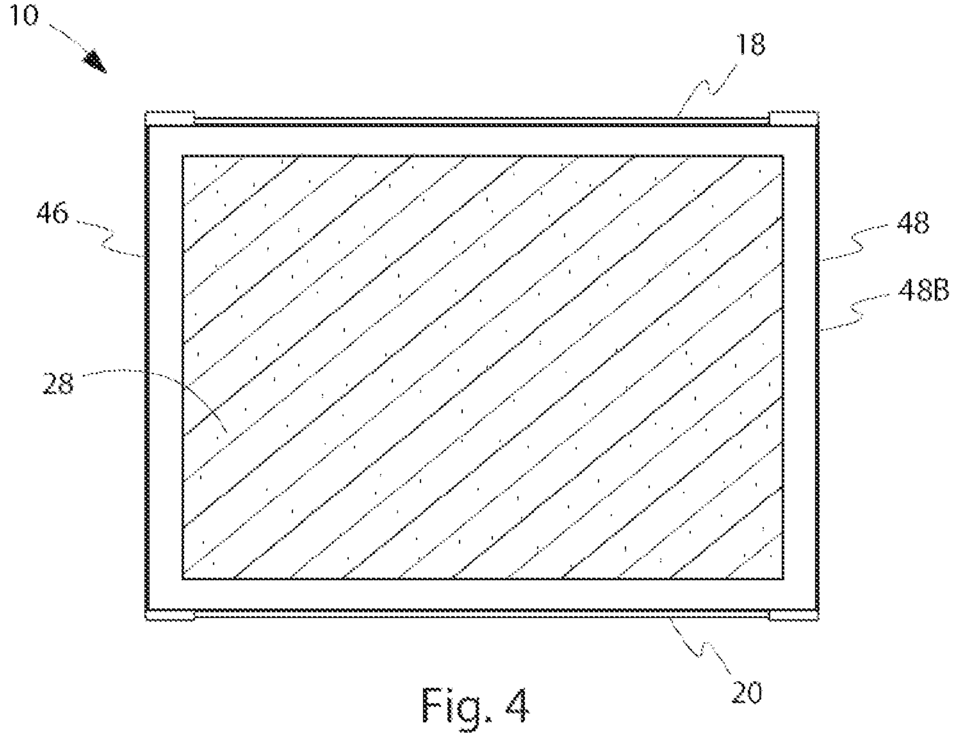
FIG. 4 is a top view of the device of FIG. 1 in an open position.

FIG. 1 is a front perspective view of an illustrative embodiment of a device according to the present invention in a closed position illustrating several preferred exterior features and components. FIG. 2 is a side sectional view of the device of FIG. 1 illustrating several preferred interior features and components. FIG. 3 is a top view of the device of FIG. 1, and FIG. 4 is a top view of the device of FIG. 1 in an open position.

Figure 5:
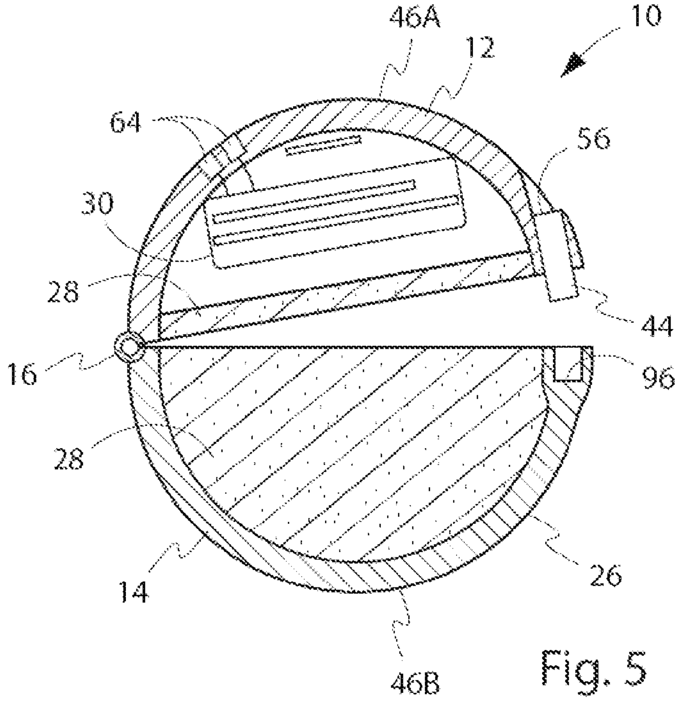
FIG. 5 is a side sectional view of another illustrative embodiment of a device according to the present invention in a partially open position.
Figure 6:
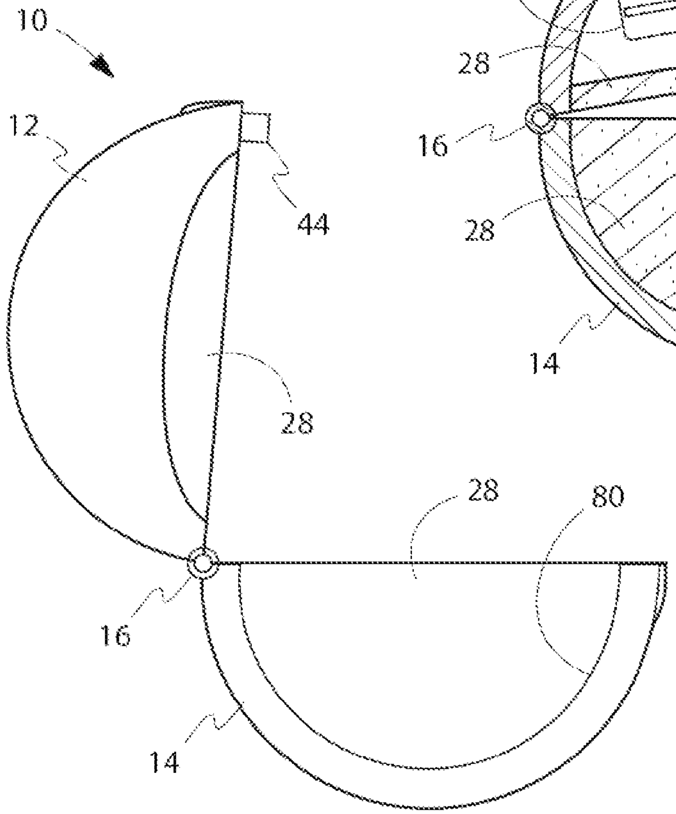
FIG. 6 is a side view of the device of FIG. 5 in an open position.
Figure 7:
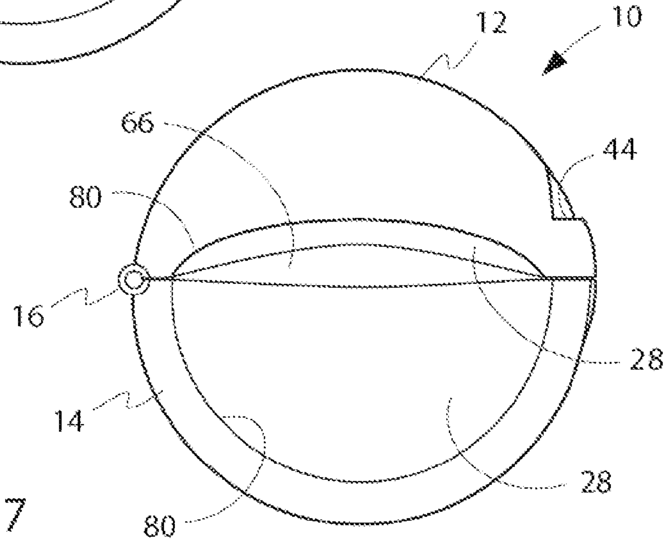
FIG. 7 is a side view of the device of FIG. 5 in a closed position.

FIG. 5 is a side sectional view of another illustrative embodiment of a device according to the present invention in a partially open position illustrating several preferred interior features and components. FIG. 6 is a side view of the device of FIG. 5 in an open position and FIG. 7 is a side view of the device of FIG. 5 in a closed position, both illustrating several preferred features and components.

Figure 8:
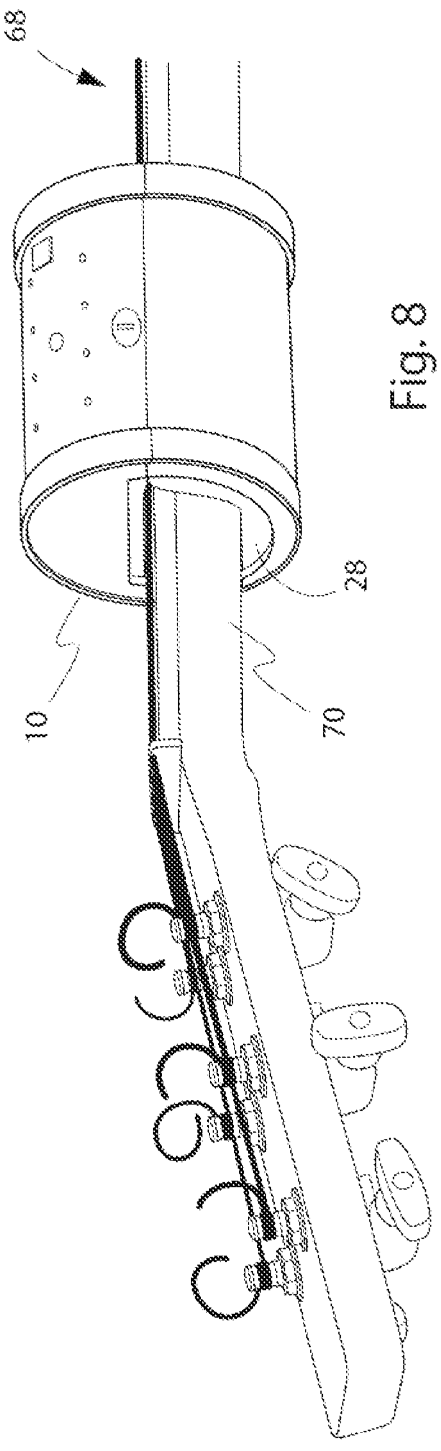
FIG. 8 is a side perspective view of an embodiment of a device according to the present invention secured to a guitar neck.
Figure 9:
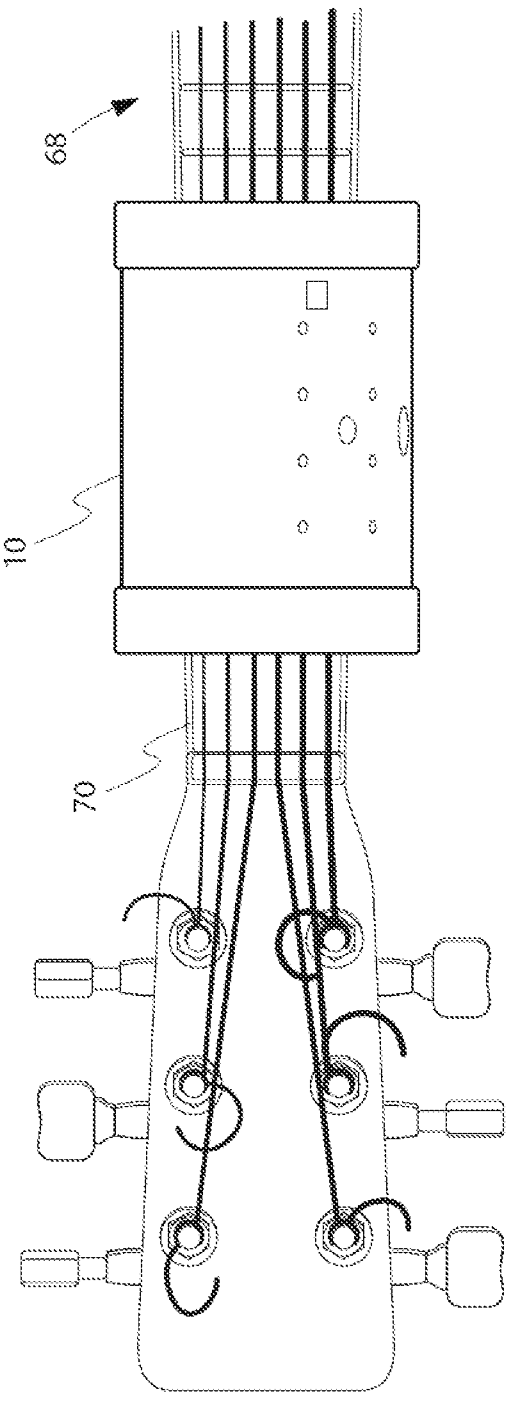
FIG. 9 is a top view of the device of FIG. 8 secured to a guitar neck.
Figure 10:
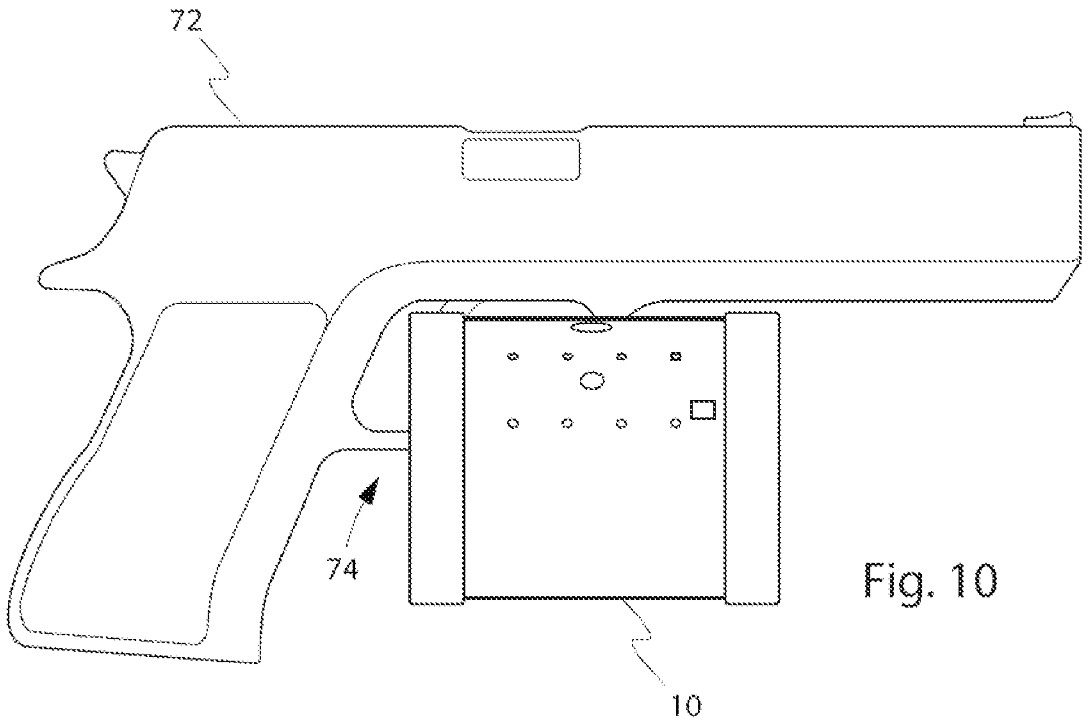
FIG. 10 is a side perspective view of an embodiment of a device according to the present invention secured to the trigger area of a hand gun.
Figure 11:
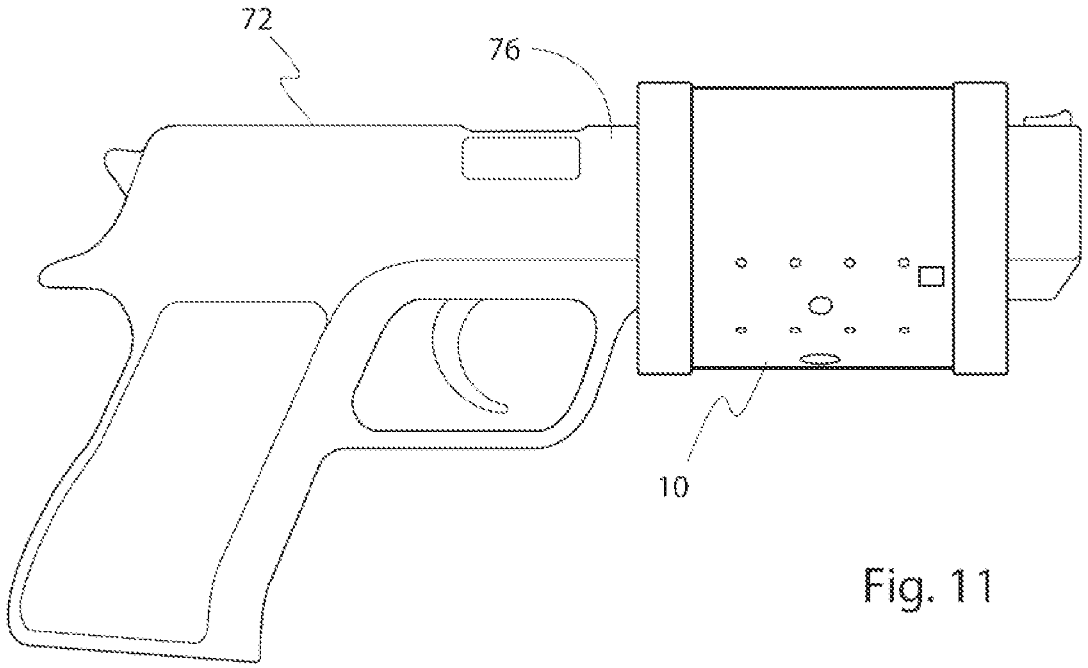
FIG. 11 is a side perspective view of an embodiment of a device according to the present invention secured to the barrel of a hand gun.

FIG. 8 is a side perspective view and FIG. 9 is a top view of an embodiment of a device according to the present invention secured to a guitar neck. FIG. 10 is a side perspective view of an embodiment of a device according to the present invention secured to the trigger area of a hand gun and FIG. 11 is a side perspective view of an embodiment of a device according to the present invention secured to the barrel of a hand gun. FIG. 12 is a front view of an embodiment of a device according to the present invention secured to an automobile steering wheel.

FIG. 13 is a side perspective view of another illustrative embodiment of the device according to the present invention illustrating several preferred features and components.

Figure 14:
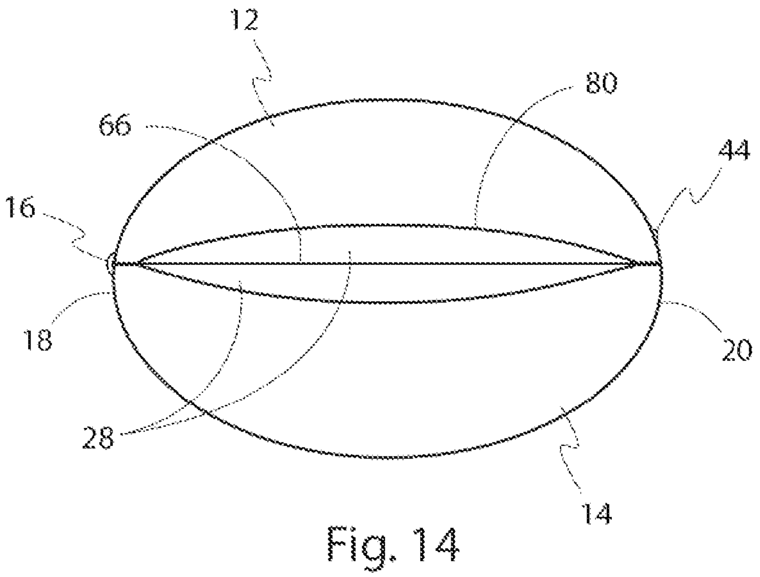
FIG. 14 is a side view of a device according to the present invention.
Figure 15:
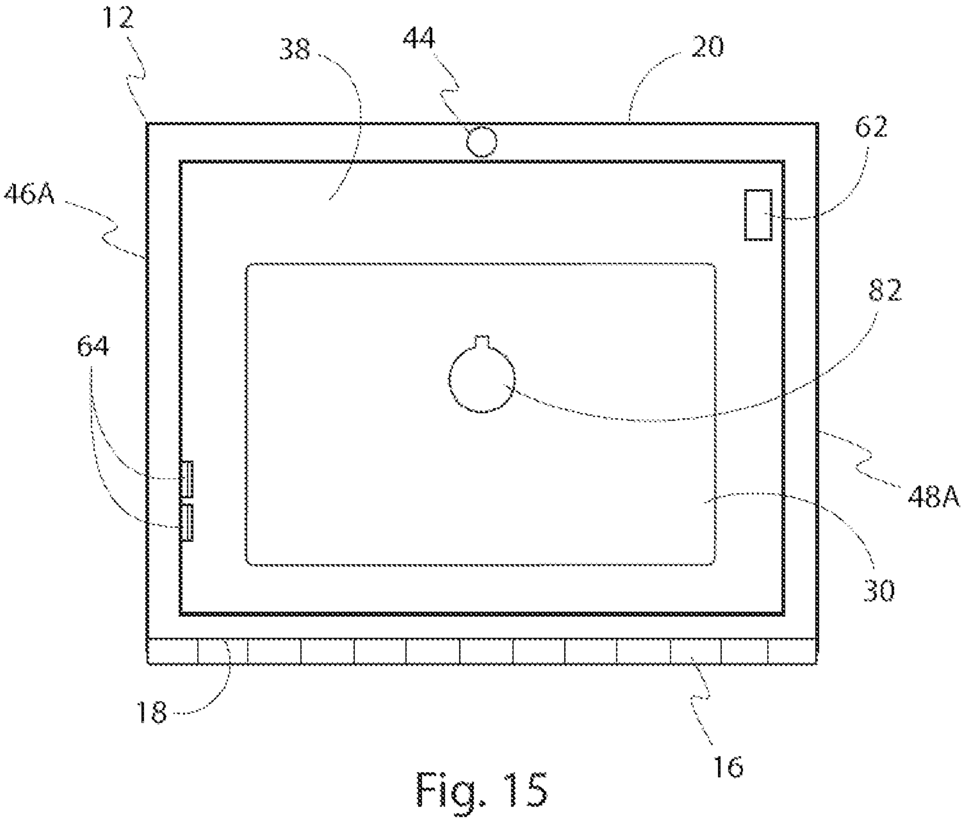
FIG. 15 is a view of the interior of a top piece of the device of FIG. 14.

FIG. 14 is a side view of another illustrative embodiment of the device according to the present invention illustrating several preferred features and components. FIG. 15 is a view of the interior of a top piece of the device of FIG. 14 illustrating several preferred interior features and components.

Figure 16:
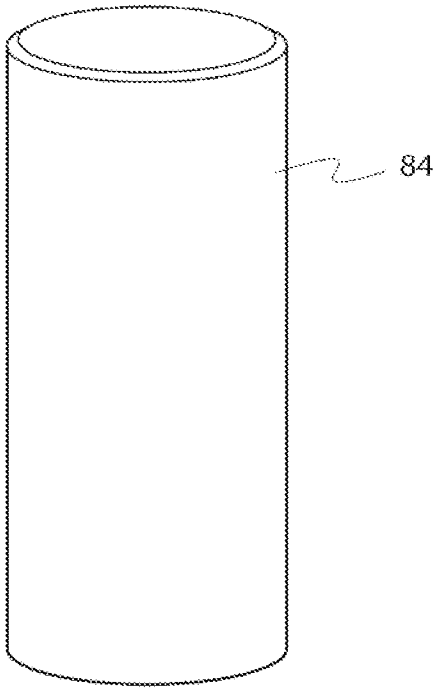
FIG. 16 is a side view of a cylinder lock suitable for use with the present invention.
Figure 17:
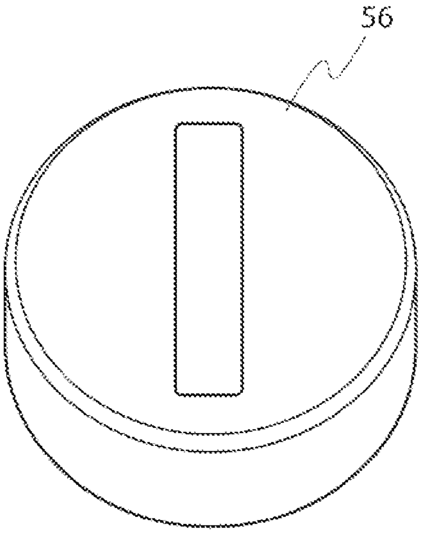
FIG. 17 is a top view of the lock of FIG. 16 with a key lock.
Figure 18:
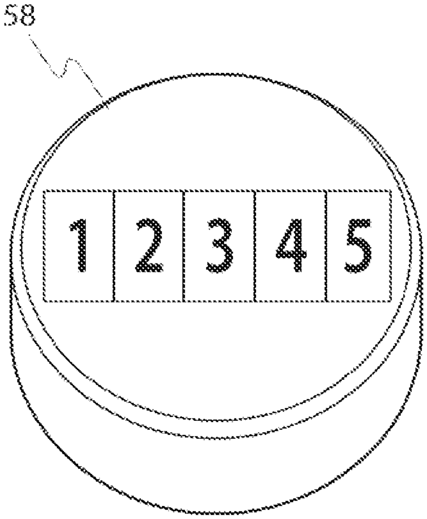
FIG. 18 is a top view of the lock of FIG. 16 with a combination lock.
Figure 19:
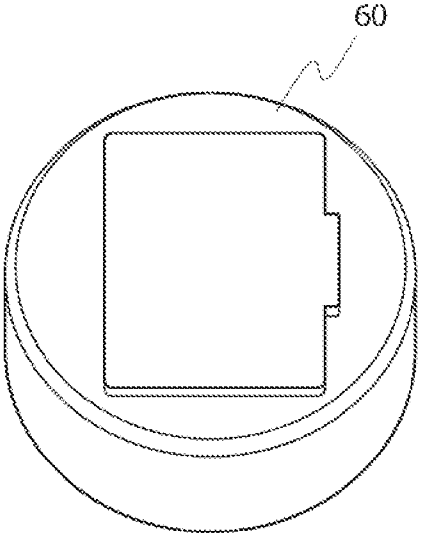
FIG. 19 is a top view of the lock of FIG. 16 with a code lock.

FIG. 16 is a side view of a cylinder lock suitable for use with the present invention. FIGS. 17-19 are top views of various types of locks, with FIG. 16 showing a key lock, FIG. 18 showing a combination lock, and FIG. 19 showing a code lock.

Figure 20:
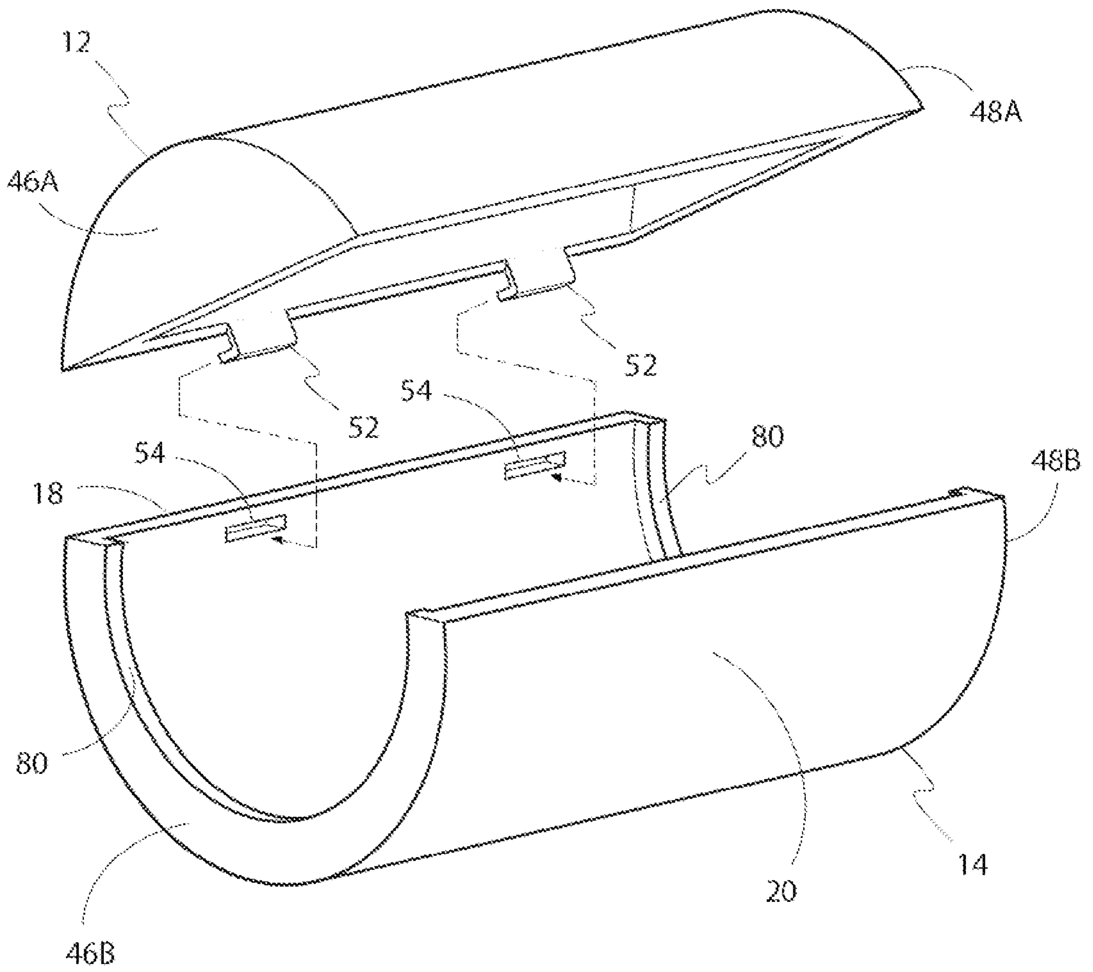
FIG. 20 is a side perspective view of an embodiment of a device according to the present invention using a tab and slot connection mechanism.

FIG. 20 is a side perspective view of an embodiment of a device according to the present invention using a tab and slot connection mechanism.

Figure 21:
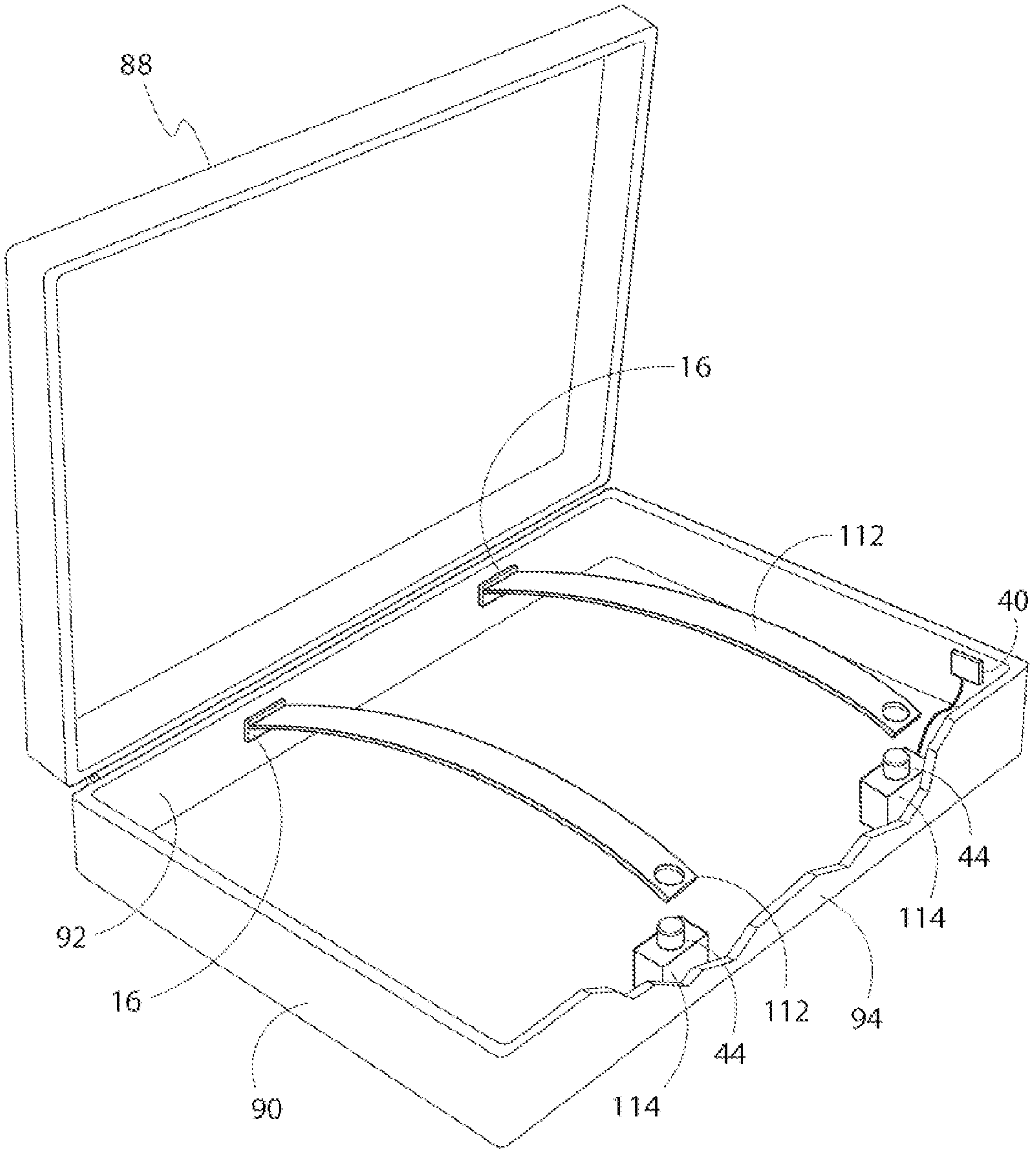
FIG. 21 is a front perspective view of a device according to the present invention incorporated into a carrying case.

FIG. 21 is a front perspective view of a device according to the present invention incorporated into a carrying case or attaché case. FIG. 22 is a top perspective view of a device according to the present invention incorporated into a musical instrument carrying case. FIG. 23 is a top perspective view of a device according to the present invention incorporated into a firearm carrying case.

Figure 24:
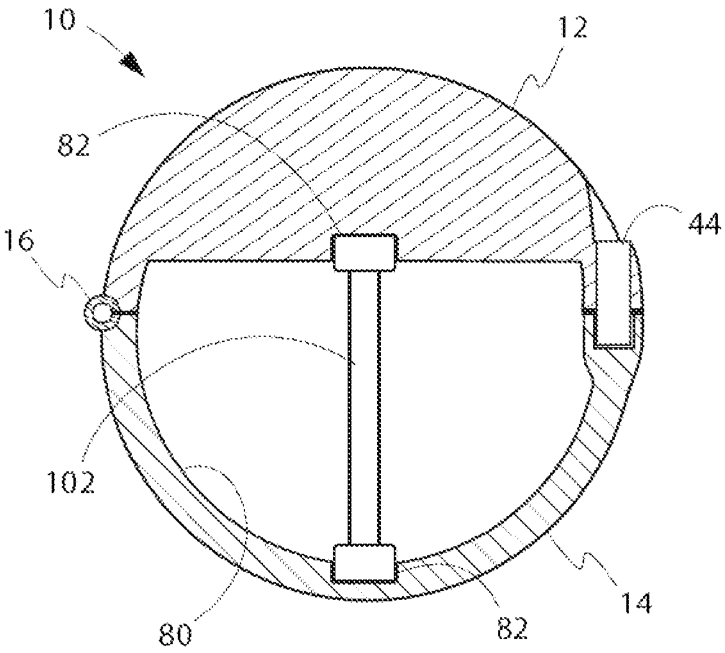
FIG. 24 is a side sectional view of a device according to the present invention utilizing a locking pin.
Figure 25:
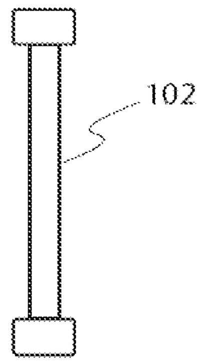
FIG. 25 is a side view of a locking pin for use with the device of FIG. 24.
Figure 26:
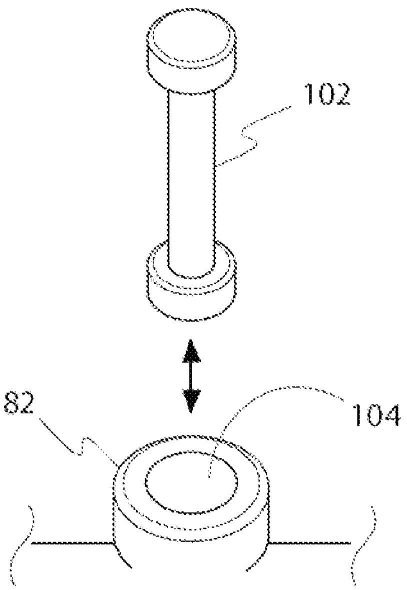
FIG. 26 is a side perspective view of a locking pin and anchor for use with the device of FIG. 24.
Figure 27:
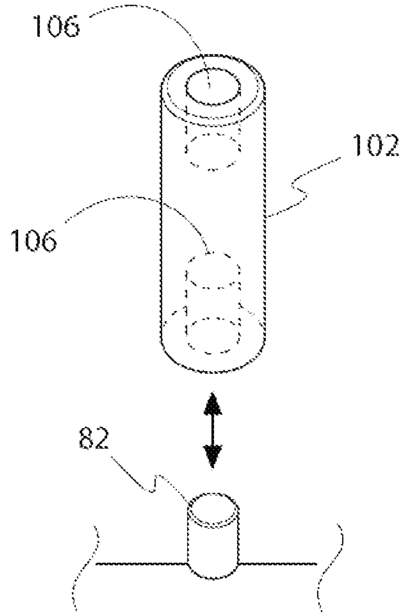
FIG. 27 is a side perspective view of a locking pin and anchor for use with the device of FIG. 24.

FIG. 24 is a side sectional view of another illustrative embodiment of the device according to the present invention utilizing a locking pin illustrating several preferred features and components. FIG. 25 is a side view of a locking pin for use with the device of FIG. 24. FIGS. 26-27 are side perspective views of alternate versions of locking pins and anchors for use with the device of FIG. 24.

Figure 31:
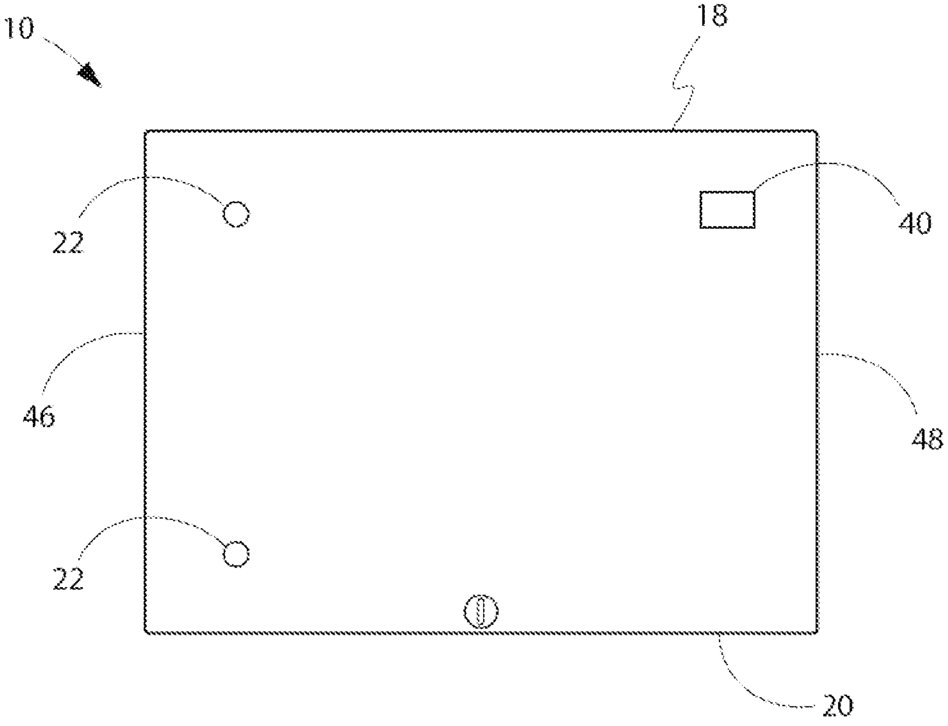
FIG. 31 is a top view of the device of FIG. 28.
Figure 32:
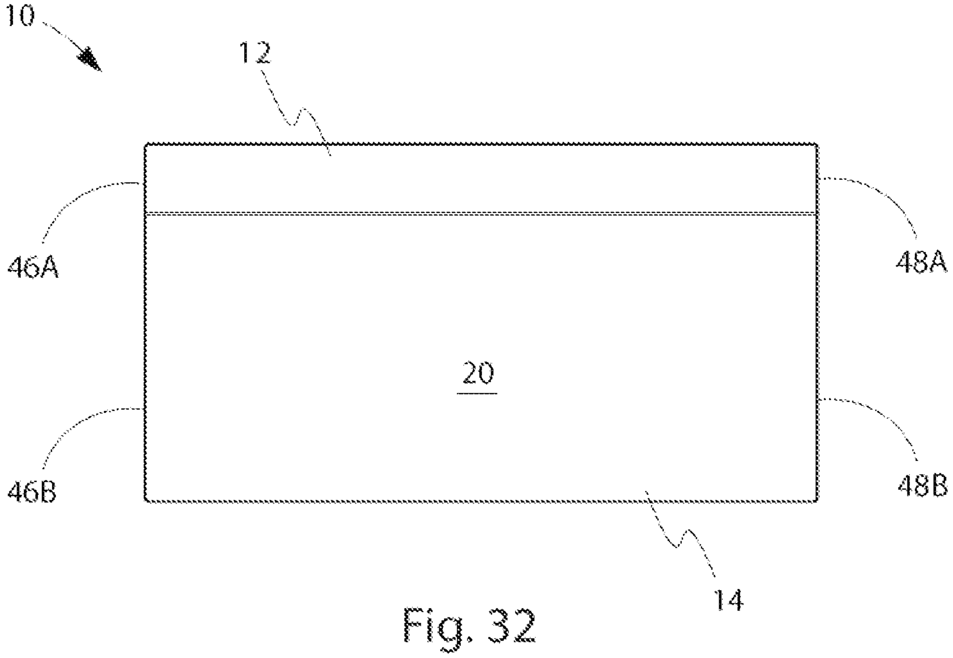
FIG. 32 is a front view of the device of FIG. 28 in a closed position.

FIG. 28 is a side sectional view of another illustrative embodiment of the device according to the present invention illustrating several preferred features and components. FIG. 29 is a side view of the device of FIG. 28 in a closed position, FIG. 30 is a side view of the device of FIG. 28 in an open position, FIG. 31 is a top view of the device of FIG. 28, and FIG. 32 is a front view of the device of FIG. 28 in a closed position, all illustrating several preferred features and components.

Figure 33:
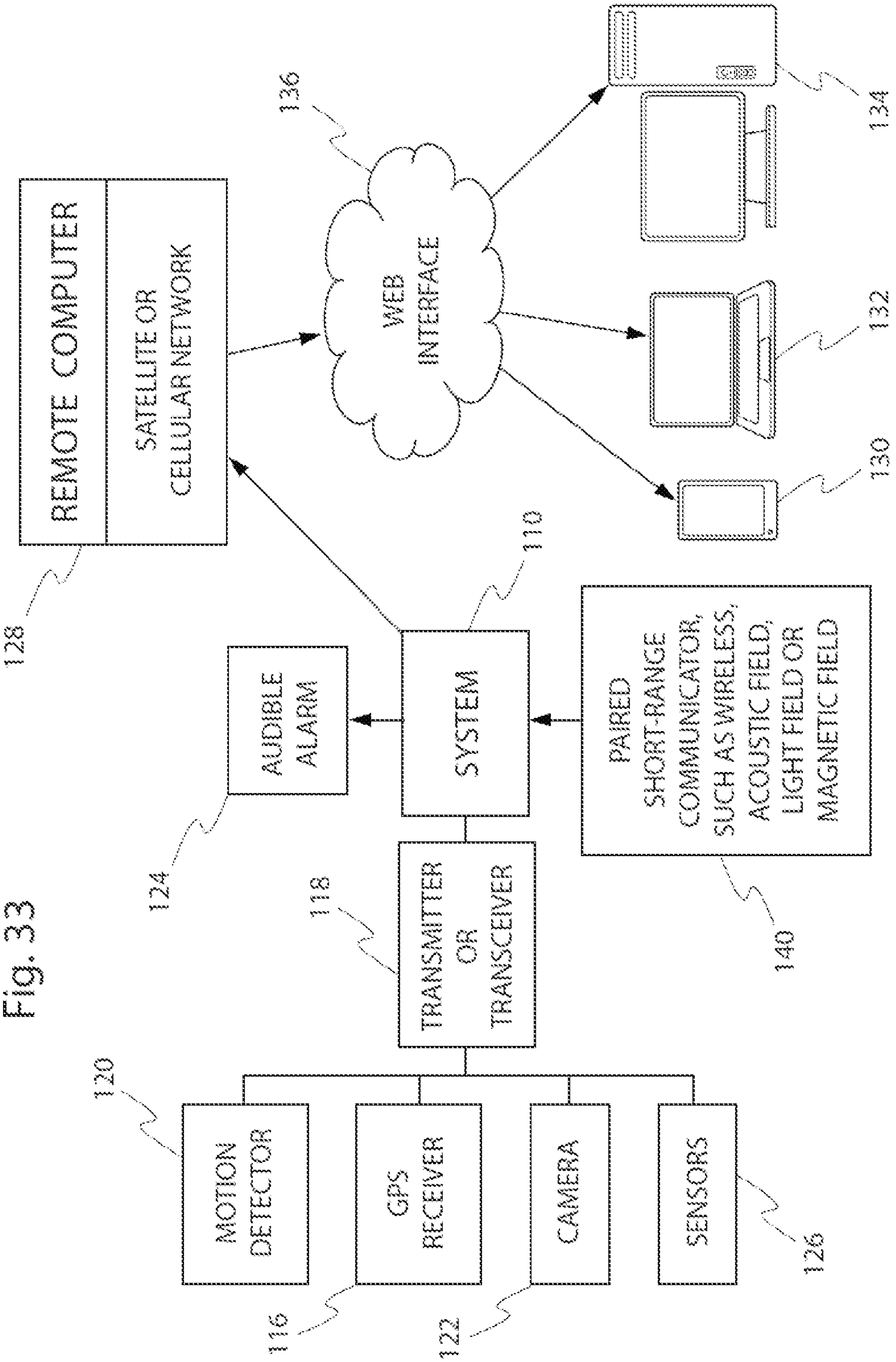
FIG. 33 is a schematic of a system according to the present invention.

FIG. 33 is a schematic of a system according to the present invention, including several embodiments of the system.

Referring to the figures, preferred embodiments of the security system and device of the present invention comprise at least one relatively small portable device 10 about 3" in width or diameter, about 4" in length, and about 2"-2.5" in height or thickness when closed. Other dimensions are suitable depending on the object to be secured, but it is preferable that certain embodiments of the device 10 be portable, with a standard preferred width of 2"-4", a preferred length of 3"-5", and a preferred height or thickness of 2"-4". From the top view, the device 10 preferably appears generally rectangular in shape. From the side view, the device 10 preferably appears generally oval, racetrack, or round in shape. The device 10 preferably is constructed of an outer shell 26 comprising two primary but separate pieces consisting of a top piece 12 and a bottom piece 14, relatively equal in size. The two pieces 12, 14 are hingedly connected by a hinging mechanism 16 on a first side 18. A non-hinged second side 20, preferably opposite the first side 18 across the width of the device 10, open and closes. The pieces 12, 14 open to allow the device 10 to be clamped on and around an object or part of an object.

Other preferred embodiments of the security system include incorporation of features and components of the device 10 into or onto carrying cases, protective cases, and enclosures for objects to be secured. For example, rather than attaching the device 10 to the object to be secured, relevant features and components of the device 10 can be incorporated as part of a carrying case for protecting and/or transporting the object to be secured.

Referring now to FIGS. 1-4, the exterior of the device 10 comprises outer shell 26, which preferably is made of a hard, tamper resistant material such as hardened steel or a hard composite, preferably ¼" or more in thickness, such that it is of sufficient strength to prevent breakage, cutting destruction, or compromise by a relevant proportion of potential unauthorized users or thieves. If a material such as steel is used, the outer shell 26 preferably comprises some small windows 22 near the operating electronics that allow electromagnetic waves and/or other signals to enter and leave the device 10. The windows 22 can be ports or openings or can be materials that are transparent to electromagnetic waves and/or other signals. The exterior of the device 10 also preferably comprises an indicator light 24 that illuminates to indicate status of the device 10.

The interior of the device 10, and particularly the interior of the top piece 12 and the bottom piece 14, can be generally hollow so as to contain functional and/or other necessary and/or optional components. For example, the two pieces 12, 14 each can be generally hollow, cup- or bowl-shaped structures having a hollow interior defined by the cup- or bowl-shaped outer shell 26. The two pieces 12, 14 are connected together along the first side 18 by a hinging mechanism 16 to form a clamshell-like configuration, with open ends of the cups or bowls facing each other when the device 10 in the closed position. With such a configuration, in the closed position, the pieces 12, 14 would present a predominantly and/or generally uniformly closed exterior or barrier protecting the interior of the device 10 and preventing or hindering unauthorized persons from accessing the interior of the device 10.

The interior of the top piece 12 of the device 10 can comprise padding 28, such as memory type foam, that abuts an optional compartment 30 that houses the operating electronic components 32 and battery power supply of the device 10. The padding in top piece 12 also can be removable. The first side 18A of the top piece 12 and the second side 20A of the top piece 12 preferably are straight so that they can more efficiently cooperate with the first side 18B of the bottom piece 14 and the second side 20B of the bottom piece 14, respectively, to allow for proper operation of the hinging mechanism and the locking mechanism 44. Top piece 12 further comprises a third side 46A and a fourth side 48A, both of which extend between ends of the first side 18A and the second side 20A so as to form a generally rectangular opening or rim. Third side 46A and fourth side 48A also can be straight, but more preferably have a concave structure for more efficiently cooperating with the object to be secured. Additionally, the concave structure allows the padding 28, rather than the edges of the third side 46A and the fourth side 48A, to contact the object to be secured, as the padding 28 at least initially extends out from the interior of the top piece 12 beyond the rim of the top piece 12. The concavity of third side 46A and fourth side 48A is shallow relative to the concavity of the third side 46B and the fourth side 48B as top piece 12 houses the operating electronic components 32 and preferably requires at least a portion of solid wall or outer shell 26 to protect the operating electronic components 32.

The electronics compartment 30 preferably abuts the interior surface of the top piece 12 shell so as to facilitate the transmission of electronic signals, such as electromagnetic waves, from the operating electronic components 32 to a remote receiving device. Appropriately sized ports or windows 22 through the exterior outer shell 26 of the top piece 12 can facilitate or allow such electromagnetic waves to communicate through the exterior outer shell 26 of the device 10 and to the operating electronic components 32 contained within the device 10. Alternatively, the operating electronic components 32 can be attached to the interior surface of the top piece 12 or simple placed within the hollow interior of the top piece.

The operating electronics components 32 can be housed within the top piece 12 or with the electronics compartment 30 within the top piece. Operating electronics components 32 can comprise a circuit board 34 for operating the system and device 10, an antenna 36 for communicating with a remote receiver or network, and batteries 38 for powering the circuit board 34 and device 10. Although the operating electronics 32 can be custom-designed for each specific application of the device 10, a suitable version of the operating electronics can be the simplex personal and asset tracker disclosed and claimed in U.S. Pat. No. 8,130,096 or any other similar geolocation system and device for determining and reporting location. For example, a suitable means for determining and reporting location can comprise a radio transmitter or transmitter and transceiver that can process and transmit all such information over terrestrial or satellite networks, or both, using web-based interfaces and applications to disseminate and report the information. An optional retractable or free hanging signal extender 40 can be attached to the exterior of the device 10 to increase the range of communication between the device and the remote receiver or network.

The system and/or at least one of its devices 10 also can comprise an audible alarm that sounds an alert when the system or the device 10 is activated and/or compromised. The presence of such an audible alarm would act as a deterrent to theft and/or unauthorized use of an object and would help facilitate the recovery of an object that is otherwise misplaced, lost or stolen. If the device comprises an audible alarm, the alarm electronics can be incorporated into the circuit board 34 and an alarm speaker 50 can be included. The system and/or at least one of the devices 10 also can comprise a visual alarm, such as external light emitting diodes, that provides a visual alert when the system is activated and/or compromised.

The interior of the bottom piece 14 of the device 10 can comprise padding 28, such as memory type foam, partially or preferably completely filling the interior of the bottom piece 14. The padding in bottom piece 14 can be removable. The first side 18B of the bottom piece 14 and the second side 20B of the bottom piece 14 preferably are straight so that they can more efficiently cooperate with the first side 18A of the top piece 12 and the second side 20A of the top piece 12, respectively, to allow for proper operation of the hinging mechanism and the locking mechanism 44. Bottom piece 14 further comprises a third side 46B and a fourth side 48B, both of which extend between ends of the first side 18B and the second side 20B so as to form a generally rectangular opening or rim. Third side 46B and fourth side 48B also can be straight, but more preferably have a concave structure for more efficiently cooperating with the object to be secured. Additionally, the concave structure allows the padding 28, rather than the edges of the third side 46B and the fourth side 48B, to contact the object to be secured, as the padding 28 at least initially extends out from the interior of the bottom piece 14 beyond the rim of the bottom piece 14. The concavity of third side 46B and fourth side 48B is deep relative to the concavity of the third side 46A and the fourth side 48A such that the side view cross-section of bottom piece 14 is generally U-shaped. When the device 10 is secured to the object to be secured, preferably the object to be secured is retained for the most part within the concavity of the bottom piece 14 and only partially if at all within the concavity of the top piece 12.

The padding 28 preferably contacts the object to be secured so that the device 10 does not damage the object when the device 10 is attached to the object. Through the shape of the interior of device 10, such as the shape of the rim of the open third and fourth sides 46, 48 of the top and bottom pieces 12, 14, and the padding 28 placed therein, a device 10, when fully closed, preferably fits generally snugly around, for example, a guitar or violin neck, firearm, bicycle frame, car steering wheel, as well as other objects similarly shaped. That is, an object or part of an object being rod-like or cylindrical in shape, or somewhat rod-like or cylindrical in shape where one or more sides can be flat or squared, so long as the padding 28 can shape around the object or object part and the device 10 closed about the object or object part.

Optional additional exterior padding 42 can be attached to the exterior of the device 10 to reduce the possibility of damage to the object to be secured by the device 10. For example, the exterior padding 42 can be strategically placed on or near the edges of the device 10 to reduce the possibility that the edges of the device 10 will contact and scratch the object to be secured.

The features, components, and structure of the top piece 12 and the bottom piece 14 can be interchanged.

The device 10 comprises a locking mechanism 44 on the second side 20 opposite the hinging mechanism 16 on the first side 18, wherein the locking mechanism 44 locks the two primary pieces 12, 14 of the device 10 together. The locking mechanism 44 can be any of the typical locking mechanisms.

There can be an on-off switch 62 located on the interior surface of the top piece 12 or on or near the exterior surface of the electronics compartment 30, below the removable padding 28. The switch 62 preferably is within the interior of the device 10 so as to prevent inadvertent or unauthorized actuation when the device 10 is closed and locked on an object. The device 10 can be capable of being electronically locked and unlocked, turned to ready mode, activated, and deactivated by for example a hand-held key fob type device, magnetic card, or similar activating mode. The device 10 also can be locked and turned to ready mode, activated, and unlocked and deactivated, by key, code, or biometric (fingerprint or similar biological identification) means. There also can be at least one USB port 64 in the device 10 for device accessories, for the transfer of information, and for programming and updating.

Referring now to FIGS. 5-7, a similar but alternate embodiment of the device 10 as shown in FIGS. 1-4 is shown. FIG. 5 is a side sectional view in a partially open position illustrating in more detail the structure and location of the padding 28, the locking mechanism 44, the electronics compartment 30 and operating electronic components 32, and the USB ports 64. In FIG. 5, a key lock 56 is shown, with the key entry, lock cylinder, and hook shown on the top piece 12 and the striker plate or lock plate 96 shown on the bottom piece 14. FIGS. 6 and 7 are side views of the device of FIG. 5 in an open position and in a closed position, respectively. In the open position, the object to be secured can be place within the device 10 between first and second sides 18, 20, and extending outwardly from the device between the third and fourth sides 46, 48. In the closed position, the object to be secured is located between the padding 28 of the top piece 12 and the padding 28 of the bottom piece 14. A space 66 is shown in FIG. 7 to represent the location of the object to be secured within the device 10. As can be seen in these views, the padding 28 is placed within the device 10 to as to contact the object to be secured when the object to be secured is placed within the device 10.

Referring now to FIGS. 8-12, various uses of the device 10 on objects to be secured are shown. FIG. 8 is a side perspective view and FIG. 9 is a top view of an embodiment of a device 10 according to the present invention secured to a guitar neck 70 of a guitar 68. The device 10 can be placed similarly on a violin, cello, and other string instruments. The device 10 can be placed analogously about the tubing of woodwind or brass instruments. FIG. 10 is a side perspective view of an embodiment of a device 10 according to the present invention secured to the trigger area 74 of a hand gun 72 and FIG. 11 is a side perspective view of an embodiment of a device 10 according to the present invention secured to the barrel 76 of a hand gun 72. The device can be placed similarly on a rifle or shotgun. The device can be placed analogously about the tubing, supports, or handles of a deer stand, fire arm case, or ammunition box. FIG. 12 is a front view of an embodiment of a device 10 according to the present invention secured to an automobile steering wheel 78. The device 10 can be placed similarly on a bicycle, scooter, or motorcycle handle bars or frame. The device 10 can be placed analogously about furniture and art objects. As can be seen, the device 10 can be secured to any object having a structure or structural part that can fit between the two pieces 12, 14 of the device 10.

Referring now to FIG. 13, a side perspective view is shown of another illustrative embodiment of the device 10 according to the present invention illustrating an embodiment with enlarged side openings 80 when compared to the devices 10 of FIGS. 1-7. In this embodiment, top piece 12 and bottom piece 14 are generally U-shaped structures hingedly connected by the hinging mechanism 16 on the first side 18 and securable together in the closed position by the locking mechanism 44 on the second side 20. Third and fourth sides 46, 48 are relatively open, allowing the securing of an object to be secured having a larger diameter or cross-section. Padding 28 can be a thin layer only about the interior of the top and bottom pieces 12, 14 so as to cover the operating electronic components 32 and the interior surfaces of the top and bottom pieces 12, 14. Alternatively, as shown in FIG. 13, padding 28 can be a thick layer generally completely filling the interior volume between top and bottom pieces 12, 14.

Referring now to FIG. 14, a side view is shown of another illustrative embodiment of the device 10 according to the present invention similar to the device 10 shown in FIGS. 5-7. In this embodiment, third and fourth sides 46, 48 have less or little to no concavity allowing the securing of an object to be secured having a smaller diameter or cross-section. FIG. 15 is a view of the interior of a top piece 12 of the device 10 of FIG. 14, but also is illustrative of the interior of the top piece 12 of other embodiments of the device 10, such as the embodiment of FIGS. 5-7. In this view, the padding 28 has been removed from the top piece 12 so as to show a location and/or placement of various features and components of the device 10 previously disclosed. Also visible is an anchor 82 for the locking pin 86 accessory disclosed in connection with FIGS. 24-25.

Referring now to FIG. 16, a side view is shown of a cylinder lock suitable for use as a locking mechanism 44 with the present invention. The lock barrel 84 of a cylinder lock as the locking mechanism 44 can be located within a corresponding cylinder in the top piece 12, as shown in more detail in FIG. 5. Referring now to FIGS. 17-19, the locking mechanism 44 can be any of the typical locking mechanisms, such as for example key locks 56, combination locks 58, and electronic locks 60. For example, the device 10 can be capable of being mechanically or electronically locked and unlocked.

Referring now to FIG. 20, as an alternative to a standard hinge as the hinging mechanism 16, the device 10 can be in two separate pieces 12, 14 having a tab 52 and slot 54 configuration or the equivalent on at least the first side 18 and the locking mechanism 44 on at least the second side 20 preferably opposite the first side 18 having the tab 52 and slot 54, wherein on the first side 18 the pieces 12, 14 fit into each other via the cooperation of the tab 52 and slot 54, with the locking mechanism 44 on the opposite second side 20 so that when locked the device 10 cannot be opened without disengaging the locking mechanism 44.

Referring now to FIG. 21, a front perspective view is shown of a device 10 according to the present invention incorporated into a carrying case 86. Carrying case 86 can be any typical case such as an attaché case, a computer case, a suitcase, or a sample case, or a musical instrument carrying case or firearm carrying case as disclosed in connection with FIGS. 22-23, having a lid 88 and a base 90. In this embodiment, top piece 12 is in the form of at least one movable arm 112 and at least one corresponding bottom piece 14 is in the form of a stationary bottom piece 114. In this embodiment, the operating electronic components 32 preferably is contained within the bottom piece 114, and the bottom piece 114 is secured onto the base 90. The arm 112 is hingedly secured to the carrying case 86, and preferably to the base 114. As shown in FIG. 21, the arm 112 is hingedly secured to a rear wall 92 of the base 112 and the bottom piece is secured to a front wall 94 of the base 112. The locking mechanism 44 cooperates between the arm 112 and the bottom piece 114, with the lock barrel 84 being on the arm 112 or the bottom piece 114 and the lock plate 96 being on the bottom piece 114 or the arm 112, respectively.

In the carrying case 86 embodiment, the arm 112 is pivoted upwards or away from the base 90 so as to allow access to the base 90, the object to be secured is placed within the base 90, and the arm 112 is pivoted downwards or towards the base 90, and the locking mechanism 44 engaged. It is preferable that the bottom piece 114 be secured within or below the surface of the base 90 for better security.

FIG. 22 is a top perspective view of a device 10 according to the present invention incorporated into a musical instrument carrying case 98. FIG. 23 is a top perspective view of a device 10 according to the present invention incorporated into a firearm carrying case 100. The musical instrument carrying case 98 and the firearm carrying case 100, and any other similar, analogous, or equivalent type of carrying case, protective case, or enclosure is structured and operates in a manner similarly, analogously, or equivalently to the carrying case 86. The arm 112 can comprise padding 28 to protect the object to be secured.

Referring now to FIGS. 24-27, in another embodiment, with some or all of the padding removed from the device 10, a locking pin attachment can be used to lock the device 10 through an opening of an object to be secured to facilitate the device 10 locking around part of the object to be secured. FIG. 24 is a side sectional view of the device 10 showing a locking pin 102 secured between anchors 82 and FIG. 25 is a side view of the locking pin 102. In this embodiment, each of top piece 12 and bottom piece 14 further comprises an anchor 82 on its respective interior surface. In one embodiment, the anchor 82 can be a raised cylinder having a cylinder recess 104 into which the locking pin 102 is inserted as shown in FIG. 26, in which case the locking pin 102 can be a solid rod or shaped solid rod. In another embodiment, the anchor 82 can be a raised pin or bump over which the locking pin 102 is placed as shown in FIG. 27, in which case the locking pin 102 comprises a pin recess 106 for retaining the locking pin 102.

An example of a use for the locking pin attachment embodiment is where the locking pin 102 locks in the device 10 when the device 10 is closed through the trigger area 74 opening on a handgun 72 or other gun. The locking pin 102 can extend between the top piece 12 and the bottom piece 14 and can be secured in place on each piece 12, 14 by the respective anchor 82 located on the interior surface of each piece 12, 14. In this embodiment, it is preferable that third and fourth sides 46, 48 have side openings 80 or concavities sufficiently large to allow a portion of the object to be secured to extend through the side openings 80. This embodiment can be used with or without padding 28.

FIG. 28 is a side sectional view of another illustrative embodiment of the device 10 according to the present invention for use with, for example, objects or parts of objects that do not fit standard sized openings. In this embodiment, a portion of the interior of the device 10 can be removed and replaced with at least one chamber 108. In this embodiment, each of the sides 18, 20, 46, 48 has no side opening 80 or concavity such that when top piece 12 and bottom piece 14 are in the closed position, the device 10 defines a generally sealed container with top piece and bottom piece defining the chamber 108. This embodiment can be used to be fully enclosed for the storage of smaller objects and valuables such as jewelry. FIG. 29 is a side view of the device of FIG. 28 in a closed position, FIG. 30 is a side view of the device of FIG. 28 in an open position, FIG. 31 is a top view of the device of FIG. 28, and FIG. 32 is a front view of the device of FIG. 28 in a closed position.

FIG. 33 is a schematic of a representative security, alarm, and/or geolocation system 110 according to the present invention, including several embodiments of the system 110. As previously disclosed, a general basic geolocation system suitable for use in connection with the present invention is the simplex transmitter/transceiver disclosed in U.S. Pat. No. 8,130,096. A portion of the system 110 can be on-board the device 10 and a portion of the system can be remote on a remote computer or network 128.

The on-board portion of the system 110 can comprise a GPS receiver 116 for determining the location of the device 10 and a relatively long-range transmitter or receiver or transceiver 118 for transmitting and/or receiving information from and/or to the device 10 to the remote computer or network 128. The transmitter or receiver or transceiver 118 can be used for communicating with a tracking service. The information transmitted and/or received can include, as disclosed in more detail herein, location information, system status information, locking and unlocking commands, activation and deactivation commands, photographs, and status. The on-board portion of the system 110 also can comprise an accelerometer or motion detector 120, a camera 122, an alarm 124, and at least one sensor 126, such as a temperature or humidity sensor. The on-board portion of the system 110 also can comprise a relatively short-range paired short range communicator 126. The short-range communicator 140 can be used for communicating with the owner's smartphone 130 and/or local computer 132 for alerts, status reports, and/or programming the device 10, for example.

The on-board portion of the system 110 can communicate with the remote computer or network 128, which in turn can communicate to the owner's or a tracking service's smartphone 130, local computer 132, and/or service computer 134. The communication can be accomplished via known interfaces, such as a web interface 136 or cloud computing.

Following is a disclosure of illustrative manners in which the device 10 and system 110 of the present invention can operate.

Generally, in its basic operation, the device 10 is attached to an object to be secured. When activated, the system 110 continuously gathers location information of the device 10, and therefore of the object to be secured, via, for example, the GPS satellite array and/or other geolocation satellite arrays and/or cellular networks and/or wireless networks. The system 110 stores this information on-board the device 10 and/or stores and/or transmits this information via a network 128. If the object to be secured, and therefore the device 10, is moved, the system 110 determines such movement via the changing geolocation information and creates an alarm. For example, the alarm can be an audible sound emanating from the alarm speaker 50, a visible light emanating from the indicator light 24, and/or an informational alarm sent to a tracking service or the owner of the object to be secured.

Preferably, the alarm includes an informational alarm. An illustrative informational alarm includes single, intermittent, or preferably continuous geolocation information regarding the device 10, which information is transmitted via the network 128 to a tracking service or the owner of the object to be secured. For example, the system 10 is activated upon acquisition of GPS signals having new coordinates wherein the new coordinates differ from previously acquired or stored GPS coordinates by a minimum predetermined amount. Such geolocation information can be sent to the smartphone, portable computer, or other computer of the tracking service or owner. The tracking service or the owner can then track the location of the device 10, and thus the object to be secured, and recover the object to be secured.

The device 10 is capable of gathering information and transmitting the information when activated over one or more networks 128, such as satellite networks or cellular networks, or both. The device 10 is capable of transmitting or transmitting and receiving data and other information over a network 128, such as a satellite network or a terrestrial network, or both. The device 10 is capable of determining location through GPS or cellular tower signal processing. The device 10 also can contain a variety of sensors 126. Sensors 126 can be internal to the device 10 or external through USB ports 64 on the device 10. For example, the device 10 can alert the owner if temperature and humidity exceed acceptable ranges. The device 10 also can contain a camera 122 or image capturing device capable of taking photographs or capturing images when the system is activated. The device 10 also can contain audible alarm 124 that sounds within a prescribed period after the system is activated, so as to allow the owner to turn off the system before the alarm sounds, for example.

Transmission of data from the system 110 can be exception based. That is, the system 110 preferably does not transmit data at prescribed intervals. Instead, the system 110 preferably only transmits upon activation of the device 10. For example, the device 10 preferably must be placed in ready mode for activation to occur. Activation of the device 10 can occur by any number of means, such as through motion, or when a paired device loses communication with another part of the system in a manner similar to a geographic fence. An example of a geographic fence is where one part of the system 110, perhaps plugged into a wall plug in a house, is continually communicating a signal, and the other part of the system 110, such as the device 10, is receiving the signal. When the part receiving the signal stops receiving a signal, the system 110 is activated. An owner or owner designated third party also can voluntarily activate the system or a device through means such as hand held key fob type devices.

A preferred transmitter or receiver or transceiver 118 can be simplex based, namely a transmitter. Simplex transmitters are relatively inexpensive, and all that is necessary to operate the system 110. If a system 110 is a two-way system, the owner can actively communicate with the system 110, placing it in ready mode and activating and deactivating through such communication, although preferably the process of locking a device 10 that has been turned on either manually or through other means places the device 10 in ready mode.

In use, the device 10 can be attached or affixed to an object to be secured by having at least one part of the device 10 clamp on, to, or around the object to be secured or a part of the object to be secured. The device 10 is closed and locked when clamped on, to, or around the object to be secured or part of the object to be secured. The device 10 preferably cannot be removed from the object to be secured without disengaging the clamp or lock by a provided means or by damaging the object to be secured. Removal of the device 10 without disengagement by a provided means can result in damage to the object to be secured or part of the object to be secured, thereby compromising the integrity of the object to be secured and rendering it substantially unusable in accordance with the intended design and purpose of the object to be secured.

The system 110 also can operate as part of a full or partial enclosure or carrying case 86 used to carry, store, protect, or display an object by means of securing the device 10 to the carrying case 86 in such a manner that the device 10 is not required to be directly attached or affixed to the object to be secured, wherein the system 110 contains at least one locking mechanism 44 that secures the object to be secured to the carrying case 86 and the object to be secured cannot be removed from the carrying case 86 without disengaging the locking mechanism 44 in a provided manner. Alternatively, the device 10 can be attached to a handle 138 of the carrying case 86.

The device 10 can use currently available locking mechanisms 44, including cylinder type locks that open electronically, by key, code and or by identification, such as biometric. The locking mechanism 44 locks the pieces 12, 14, 112, 114 of the device 10 together when placed on, to, or around an object to be secured or part of an object to be secured. The lock barrel 84 can be removable from the device 10, and all or a portion of the operating electronic components 32 for the device can be contained in the locking mechanism 44. The locking mechanism 44 can be engaged when the device 10 is closed by clamping or pressing the pieces 12, 14, 112, 114 of the device 10 together. Alternatively or in addition to, the locking mechanism 44 can be engaged and disengaged electronically through a fob type device, or by key or code, or biometric identification.

The system 110 is powered by a battery 38 or other form of power not dependent upon an electric power source, except that in a system 110 in which the device 10 is paired with another part of the system 110, the other part of the system 110 and/or additional devices 10 can be attached to an electrical power source.

The system 110 also can contain at least one input and/or output port through which accessories can be attached, through which information can be downloaded, through which the system 110 can be reprogrammed and updated, or through which the battery 38 can be recharged. The USB port 64 is a representative input and/or output port.

The system 110 can be configured to conserve power when the system 110 cannot detect or communicate with one or more satellite or terrestrial networks 128. This is accomplished through programming within the system 110 that puts the system 110 into a power conservation or sleep mode if the system 110 is not receiving or cannot detect GPS signals or cellular tower signals, or other appropriate signals, for any reason. The system 110 then can awake when the system 110 receives or detects GPS signals of cellular tower signals, or other appropriate signals.

By way of example, on a guitar 68 or other stringed instrument with a neck 70, the device 10 is closed on and around the guitar neck 70 or other part of the guitar. By further way of example, on a trumpet, the device 10 is closed on and around the lead pipe, bell or other part of the trumpet. By further way of example, on a bicycle or motorcycle, the device 10 is closed on, to, and/or around the frame, sprocket or wheel of the bicycle. By further way of example, on a firearm 72, the device 10 is closed on, to, or around the barrel 76 of the firearm 72, or on, to, or around the trigger area 74 of the firearm 72. By further way of example, on an automobile, the device 10 is closed on and around the steering wheel 78, gear shift, or other part of the automobile. The locking mechanism 44 is engaged and the device 10 cannot be removed from the object to be secured without damaging the object to be secured or disengaging the locking mechanism 44.

The sizes of the side openings 68 on the device 10 can vary to accommodate different sizes of objects to be secured. This can be accomplished through the use of various quantities and shapes of padding 68, various shapes of side openings 68, and/or through additional and alternative chambers and fittings.

The system 110 is configured via software to be activated by at least one of the following: movement or motion; loss of communication by the device 10 when paired with another part of the system 110; internal or external sensors 126; acquisition of GPS signals or cellular tower signals with coordinates that differ from previous coordinates determined over periodic intervals; use of hand held key fob type devices; and in a two-way system, use of telephone, laptop computer, or other wireless communication device or device capable of wireless communication. When activated, the system 110 communicates an alert to at least one previously designated party and device, such as for example, the owner, a tracking service, a smartphone 130, a local computer 132, and/or a service computer 134. When activated, the transmitter or receiver or transceiver 118 begins processing information, including for example location information from the GPS receiver 116 and/or image information from the camera 122, and can communicate the information at predetermined intervals over terrestrial or satellite networks 128, or both. Thus, the object to be secured can be tracked via the information transmitted from the device 10 through the system 110. Other information regarding the object to be secured also can be tracked via the information transmitted from the device 10 through the system 110.

An alarm 124 can be connected to the system 110 or contained within a device 10 so as to provide an audible alert if the system 110 is activated. The alarm 124 may contain a delay between activation and audible alert to allow for the deactivation of the system 110 or prior to the sounding of an audible alarm. Activation of the system 110 also can activate the camera 122 or other optical image capturing method or device, sensors and other devices that provide information as to status of the system 110 and about the immediate environment surrounding the system 110.

Detection of movement or motion, and loss of communication in a device 10 paired with the system 110 is accomplished through various means or combinations of means, including, but not limited to, any of the following and combinations thereof: electromagnetic waves and fields; internal and/or external sensors, including, but not limited to acoustic sensors, optical and infrared sensors, and video image processors; magnetic sensors and magnetometers; infrared; laser; radar; ultrasonic sensors; microwave sensors; induction inductive-loop detectors; acquisition of GPS or loss of GPS signals; acquisition of cellular tower signals or loss of cellular tower signals; and, triboelectric, seismic, and inertia-switch sensors. In systems 110 utilizing two-way communication, through proactively communicating with the system 110, the system owner or custodian can place the system 110 into ready mode, and can activate the system. The system owner or custodian also can deactivate the system 110 and can remove the system 110 from the ready mode.

When the system 110 is turned on and ready mode is activated, the transmitter or transceiver or transceiver 118 begins processing and transmitting information, including for example information on location and environment. An activated system 110 also can transmit images and other data. The system 110 also is capable of storing information and images via typical electronic storage means. In those systems 110 comprising an audible alarm 124, the audible alarm 124 can sound after a predetermined delay from when the system 110 is activated, with the system 110 continuing to operate in activated mode until at least one of, but not limited to, the following occurs: (i) the system 110 and/or locking mechanism 44 is disengaged using the designated point of entry and an authorized means of disengagement; (ii) a specified period of time elapses after the system 110 is activated, and/or (iii) the system owner or custodian communicates with the system 110 and takes the appropriate actions to deactivate the system 110.

The system 110 can be manually turned on and placed into ready mode, and it can be manually turned off, activated, and deactivated. The manual on-off switch 62 can be contained in the interior or on an interior part or surface of the device 10 so as to be accessible only when the device 10 is not locked or clamped on, to, or around an object to be secured. For carrying cases 86 and other enclosures where the device 10 or system 110 is integrated into the carrying case 86 or other enclosure, the on/off switch 62 can be located within a secured area of the carrying case 86 or other enclosure.

The system 110 may contain an antennae extension or signal extender 40 that allows the system 110 to transmit radio signals while the system 110 is contained in a full or partial enclosure where the system might not have continued clear access to GPS data signals or cellular tower signals absent such extension or signal extender 40. The antennae extension or signal extender 40 can be retractable, free-hanging, or completely detached from the system 110.

While the drawings for the device 10 and system 110 show certain shapes and sizes, the device 10 can be oval, round, square, rectangular, pyramidal, or other form, or combinations thereof. Further, while the accompanying drawings show a device 10 and system 110 with electronics and other components in locations within the system, the location of these electronics and/or components can vary.

It will be appreciated by persons of ordinary skill in the art that the present invention is not limited by what has been particularly shown and described herein above. Rather, the foregoing detailed description of the preferred embodiments and the appended figures have been presented only for illustrative and descriptive purposes. They are not intended to be exhaustive and are not intended to limit the scope and spirit of the invention. The embodiments were selected and described to best explain the principles of the invention and its practical applications. One skilled in the art will recognize that many variations can be made to the invention disclosed in this specification without departing from the scope and spirit of the invention.

LIST OF REFERENCE NUMERALS

10 device
12 top piece
14 bottom piece
16 hinging mechanism
18 first side
20 second side
22 windows
24 indicator light
26 outer shell
28 padding
30 electronics compartment
32 operating electronic components
34 circuit board
36 antenna
38 batteries
40 signal extender
42 exterior padding
44 locking mechanism
46 third side
48 fourth side
50 alarm speaker
52 tab
54 slot
56 key lock
58 combination lock
60 electronic lock
62 on-off switch
64 USB port
66 space
68 guitar
70 guitar neck
72 hand gun
74 trigger area
76 barrel
78 steering wheel
80 side openings
82 anchor
84 lock barrel
86 carrying case
88 lid
90 base
92 rear wall
94 front wall
96 lock plate
98 musical instrument carrying case
100 firearm carrying case
102 locking pin
104 cylinder recess
106 pin recess
108 chamber
110 system
112 arm
114 bottom piece
116 GPS receiver
118 transmitter or receiver or transceiver
120 accelerometer or motion detector
122 camera
124 alarm
126 sensor
128 remote computer or network
130 smartphone
132 local computer
134 service computer
136 web interface
138 handle

What is claimed is:

1. A security device for a stringed instrument having a neck, the security device comprising:

a) a top piece and a bottom piece each, respectively, comprising a first side, a second side, a third side and a fourth side, the first side opposite the second side, the third side opposite the fourth side, the top piece additionally comprising a compartment;

b) a retention mechanism configured to couple the first side of the top piece with the first side of the bottom piece;

c) a padding;

d) a locking mechanism; and e) a geo-location system;

wherein, when the top piece and the bottom piece engage along their respective first side, second side, third side and fourth side, the top piece and the bottom piece, together, define an internal cavity, the third side of the top piece and the bottom piece, together, define a first opening accessing the internal cavity, and the fourth side of the top piece and the bottom piece, together, define a second opening accessing the internal cavity;

wherein the internal cavity is lined by the padding;

wherein the internal cavity, the first opening and the second opening are configured to receive the neck of the stringed instrument such that only the padding touches the neck;

wherein, when activated, the locking mechanism, in conjunction with the retention mechanism, is configured to prevent disengagement of the top piece and the bottom; and wherein, when the locking mechanism is activated, the internal cavity is physically inaccessible.

2. The security device as claimed in claim 1, wherein the security device is constructed of a hard material that is capable of withstanding sharp blows without incurring substantial damage and is not susceptible to intrusion through cutting or sawing with ordinary cutting tools.

3. The security device as claimed in claim 1, wherein the security device receives and processes location data through GPS signals, wireless networks, or cellular tower signals.

4. The security device as claimed in claim 1, wherein the security device additionally comprises a radio transmitter capable of sending data over a network selected from the group consisting of satellite networks, cellular networks, wireless networks, or combinations thereof.

5. The security device as claimed in claim 1, wherein the security device additionally comprises a radio transceiver capable of sending and receiving data over a network selected from the group consisting of satellite networks, cellular networks, wireless networks, or combinations thereof.

6. The security device as claimed in claim 1, wherein the locking mechanism utilizes a pin tumbler and is manually locked and unlocked through use of a key or code.

7. The security device as claimed in claim 1, wherein the locking mechanism comprises a cylindrical housing for a fixed or removable lock barrel.

8. The security device as claimed in claim 1, wherein the locking mechanism is manually locked and unlocked through use of a key.

9. The security device as claimed in claim 1, wherein the locking mechanism comprises a removable barrel that contains operating electronic components for the device.

10. The security device as claimed in claim 1, wherein the locking mechanism comprises a locking bolt that is electronically activated when a key code to activate the locking bolt is equal to a changeable stored key code.

11. The security device as claimed in claim 1, wherein a key code to activate the locking mechanism is contained in a hand-held fob type device or on a magnetic card, and the locking mechanism is engaged or disengaged when the key fob is activated and sends a signal to the locking mechanism or when the magnetic card is or placed in close proximity to the locking mechanism.

12. The security device as claimed in claim 1, wherein the locking mechanism comprises a locking bolt that is electronically activated when a biometric identification signal received is equal to a respective changeable stored biometric code identification in the system.

13. The security device as claimed in claim 1, wherein upon engagement of the locking mechanism the system is placed into a ready to be activated mode.

14. The security device as claimed in claim 1, further comprising an audible alert that is triggered when the security device is activated.

15. The security device as claimed in claim 14, where the audible alert sounds after a predetermined period of delay from when the security device is activated so as to allow an authorized person to deactivate the security device prior to the alarm sounding.

16. The security device described in claim 1, further comprising an image capturing device for capturing images.

17. The security device as claimed in claim 1, wherein the security device is paired with and communicates with another security device or another part of the system.

18. The security device as claimed in claim 17, wherein the security device is activated upon a loss of communication with the another security device or another part of the system to which the security device is paired.

19. The security device as claimed in claim 1, wherein the security device is activated via motion or movement.

20. The security device as claimed in claim 1, wherein the security device is activated via the use of a sensor for use in detecting electromagnetic waves.

21. The security device as claimed in claim 1, further comprising a security device for detecting an input selected from the group consisting of audible sound, ultrasonic sound, subsonic sound, visible light, infrared light, video images, magnetic fields, laser light, radar, microwaves, induction, inductive-loop, triboelectric, seismic, vibration, and inertia.

22. The security device as claimed in claim 3, wherein the security device is activated upon acquisition of GPS signals having new coordinates wherein the new coordinates differ from previously acquired or stored GPS coordinates by a minimum predetermined amount.

23. The security device as claimed in claim 1, wherein upon activation of the security device, the security device communicates with a network.

24. The security device as claimed in claim 23, wherein the network is selected from the group consisting of satellite networks, cellular networks, wireless networks, or combinations thereof.

25. The security device as claimed in claim 24, wherein the system communicates by transmitting data to the network, receiving data from the network, or both.

26. The security device as claimed in claim 3, wherein the security device is placed into a power conservation mode or sleep mode when the security device is activated but the device is unable to detect or receive GPS signals or cellular tower signals.

27. The security device as claimed in claim 26, wherein the device is awakened once the system detects or receives GPS signals or cellular tower signals.

28. The security device as claimed in claim 3, further comprising an antenna to improve reception of data.

29. The security device as claimed in claim 3, further comprising an antenna to improve transmission of data.

30. The security device as claimed in claim 4, further comprising means for communicating through a web-based interface.

31. The security device as claimed in claim 5, further comprising means for communicating through a web-based interface.

32. The security device as claimed in claim 1, the security device additionally comprising:

a) a means for obtaining status data of the security device;

b) a means for reporting the status data via a communications network; and c) an audible alert that is triggered when the security device is activated, wherein the audible alert sounds after a predetermined period of delay from when the device is activated so as to allow an authorized person to deactivate the device prior to the alarm sounding.

33. The security device as claimed in claim 32, wherein the status data is location data.

34. The security device as claimed in claim 33, wherein the security device receives and processes location data through GPS signals, wireless networks, or cellular tower signals.

35. The security device as claimed in claim 33, wherein the security device comprises a radio transmitter capable of sending data over a network selected from the group consisting of satellite networks, cellular networks, wireless networks, or combinations thereof.

36. The security device as claimed in claim 35, wherein the security device comprises a radio transceiver capable of sending and receiving data over a network selected from the group consisting of satellite networks, cellular networks, wireless networks, or combinations thereof.

37. The security device as claimed in claim 33, further comprising a locking mechanism for locking the device to a stringed instrument, wherein upon engagement of the locking mechanism the security device is placed into a ready to be activated mode.

38. The security device as claimed in claim 33, wherein the security device is paired with and communicates with another security device or another part of the system.

39. The security device as claimed in claim 33, wherein the security device is activated upon acquisition of GPS signals having new coordinates wherein the new coordinates differ from previously acquired or stored GPS coordinates by a minimum predetermined amount.

40. The security device as claimed in claim 35, wherein the security device communicates by transmitting data to the network, receiving data from the network, or both.

41. The security device as claimed in claim 38, further comprising means for communicating through a web-based interface.

42. The security device as claimed in claim 1:

wherein the top piece and the bottom piece each, respectively, have a rounded contour between their respective first side and second side, the junction between the rounded contour, the third side and the fourth side lined by an exterior padding;

wherein the shape of the third side and the fourth side of the top piece and the bottom piece is, at least in part, rounded;

wherein the retention mechanism is additionally configured as a hinge;

wherein the shape of the first opening and the second opening is, at least in part, rounded; and wherein the padding lining the internal cavity compresses and assumes the shape of the neck of the stringed instrument.

43. The security device as claimed in claim 1:

wherein the top piece and the bottom piece each, respectively, have a rounded contour between their respective first side and second side;

wherein the shape of the third side and the fourth side of the top piece and the bottom piece is, at least in part, rounded;

wherein the retention mechanism comprises a tab and a slot, the slot configured to receive the tab;

wherein the shape of the first opening and the second opening is, at least in part, rounded; and wherein the padding lining the internal cavity compresses and assumes the shape of the neck of the stringed instrument.

44. The security device as claimed in claim 1:

wherein the top piece and the bottom piece each, respectively, have a rounded contour between their respective first side and second side, the junction between the rounded contour, the third side and the fourth side lined by an exterior padding;

wherein the shape of the third side and the fourth side of the top piece and the bottom piece is, at least in part, rounded;

wherein the shape of the first opening and the second opening is round; and wherein the padding lining the internal cavity compresses and assumes the shape of the neck of the stringed instrument.

45. A security device for a triggered firearm having a trigger guard defining a trigger area, the security device comprising:

a) a top piece and a bottom piece each, respectively, comprising a first side, a second side, a third side and a fourth side, the first side opposite the second side, the third side opposite the fourth side, the top piece additionally comprising a compartment and a first anchor, the bottom piece additionally comprising a second anchor;

b) a retention mechanism configured to couple the first side of the top piece with the first side of the bottom piece;

c) a locking pin comprising opposite ends, with the first anchor and the second anchor configured to receive opposite ends of the locking pin;

d) a locking mechanism; and e) a geo-location system;

wherein, when the top piece and the bottom piece engage along their respective first side, second side, third side and fourth side, the top piece and the bottom piece, together, define an internal cavity, the third side of the top piece and the bottom piece, together, define a first opening accessing the internal cavity, and the second side of the top piece and the bottom piece, together, define a second opening accessing the internal cavity;

wherein the internal cavity, the first opening and the second opening are configured to receive the trigger guard of the triggered firearm;

wherein, when the internal cavity, the first opening and the second opening receive the trigger guard, the locking pin, received by the first anchor and the second anchor, traverses the trigger area;

wherein, when activated, the locking mechanism, in conjunction with the retention mechanism, is configured to prevent disengagement of the top piece and the bottom piece; and wherein, when the locking mechanism is activated, the internal cavity is physically inaccessible.

46. The security device as claimed in claim 45, the security device additionally comprising a padding lining the internal cavity;

wherein the top piece and the bottom piece each, respectively, have a rounded contour between their respective first side and second side, the junction between the rounded contour, the third side and the fourth side lined by an exterior padding;

wherein the shape of the third side and the fourth side of the top piece and the bottom piece is, at least in part, rounded;

wherein the retention mechanism is additionally configured as a hinge; and wherein the padding lining the internal cavity compresses and assumes the shape of the trigger guard of the triggered firearm.

47. The security device as claimed in claim 45, the security device additionally comprising a padding lining the internal cavity;

wherein the top piece and the bottom piece each, respectively, have a rounded contour between their respective first side and second side;

wherein the shape of the third side and the fourth side of the top piece and the bottom piece is, at least in part, rounded;

wherein the retention mechanism comprises a tab and a slot, the slot configured to receive the tab; and wherein the padding lining the internal cavity compresses and assumes the shape of the trigger guard of the triggered firearm.

* * * * *